(12) United States Patent
Tsujimoto et al.

(10) Patent No.: US 9,462,174 B2
(45) Date of Patent: Oct. 4, 2016

(54) ELECTRONIC DEVICE AND CONTROL METHOD

(71) Applicant: CANON KABUSHIKI KAISHA, Tokyo (JP)

(72) Inventors: Yuki Tsujimoto, Tokyo (JP); Keita Sonoda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/837,914

(22) Filed: Aug. 27, 2015

(65) Prior Publication Data

US 2016/0072997 A1    Mar. 10, 2016

(30) Foreign Application Priority Data

Sep. 4, 2014  (JP) .................. 2014-180495
Sep. 4, 2014  (JP) .................. 2014-180496
Sep. 4, 2014  (JP) .................. 2014-180497
Sep. 4, 2014  (JP) .................. 2014-180498
Sep. 4, 2014  (JP) .................. 2014-180499

(51) Int. Cl.
  *H04N 5/232*  (2006.01)
  *G08C 23/02*  (2006.01)
  *H04N 5/911*  (2006.01)

(52) U.S. Cl.
  CPC .............. *H04N 5/232* (2013.01); *G08C 23/02* (2013.01); *H04N 5/911* (2013.01)

(58) Field of Classification Search
  CPC .. H04N 5/232; H04N 5/23212; H04N 5/772; G08C 23/02; H05N 5/911; H04R 25/407; H04R 3/005; G10L 21/0232; G10L 21/0208

USPC .................. 367/197; 381/92, 122, 71.14
  See application file for complete search history.

(56) References Cited

U.S. PATENT DOCUMENTS 7,171,008 B2 *   1/2007   Elko ................ H04R 3/005
                                              381/122
2015/0271439 A1 *  9/2015  Okano ............. G10L 21/0232
                                              381/71.14

FOREIGN PATENT DOCUMENTS

JP          2006-279185 A     10/2006

* cited by examiner

*Primary Examiner* — Ali Neyzari
(74) *Attorney, Agent, or Firm* — Cowan, Liebowitz & Latman, P.C.

(57) ABSTRACT

In a device, first and second transforming units acquire first and second audio spectrums from audio data obtained by first and second microphones, a first subtracting unit subtracts a first noise spectrum from the first audio spectrum if an instruction to drive a drive unit is input, a second subtracting unit subtracts a second noise spectrum from the second audio spectrum if the instruction is input, a control unit selects one of a third audio spectrum and a fourth audio spectrum in accordance with a result of comparison between the third and fourth audio spectrums, a third transforming unit acquires first audio data from the audio spectrum selected among the third audio spectrum and the fourth audio spectrum, and a fourth transforming unit acquires second audio data from the audio spectrum selected among the third audio spectrum and the fourth audio spectrum.

20 Claims, 23 Drawing Sheets

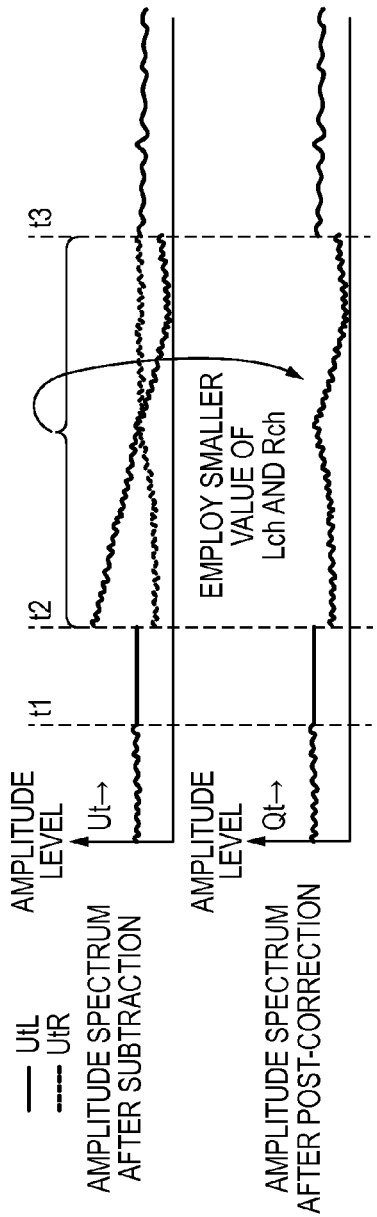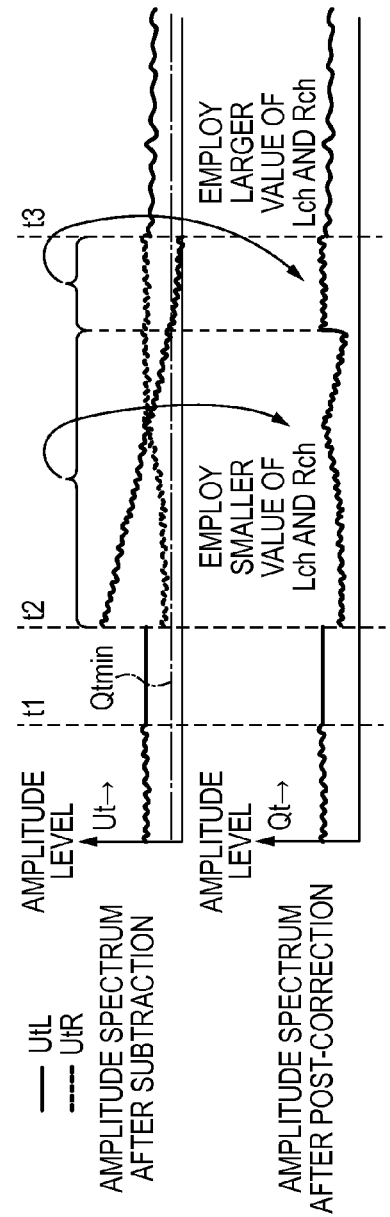

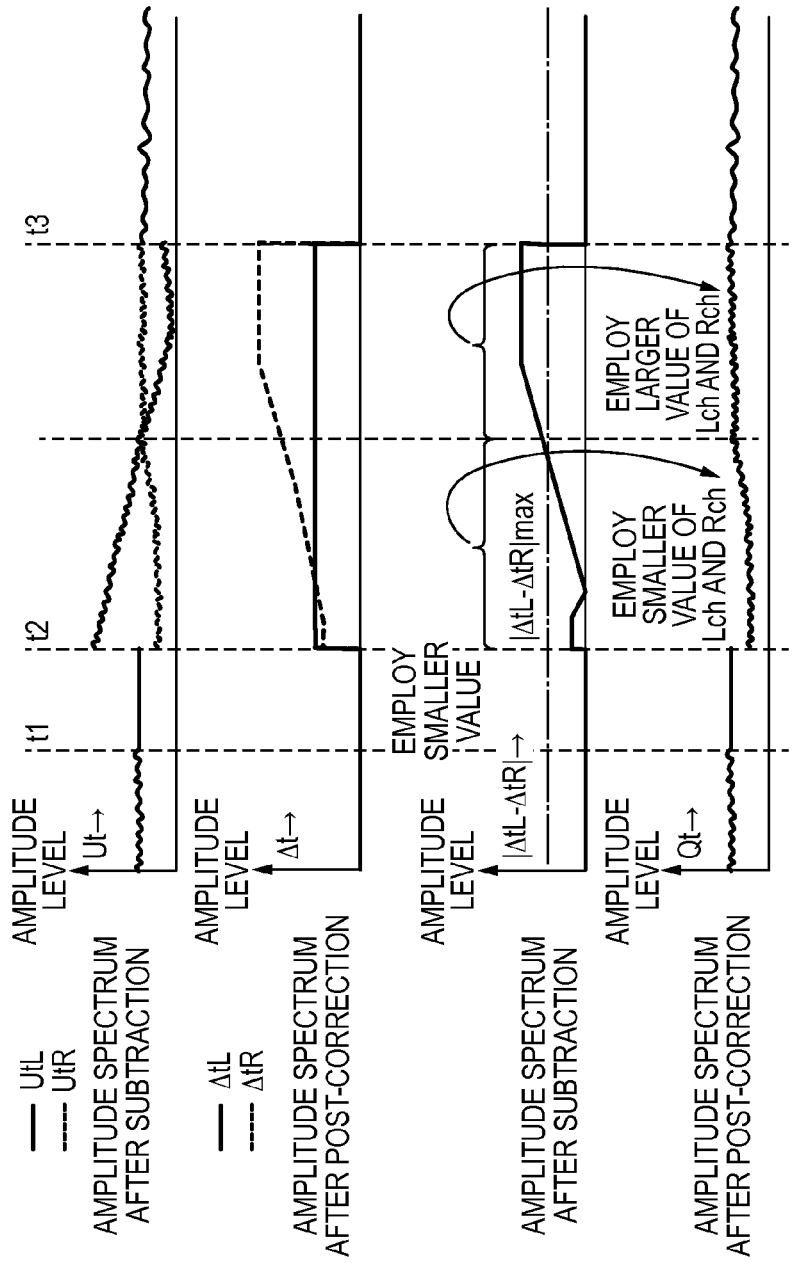

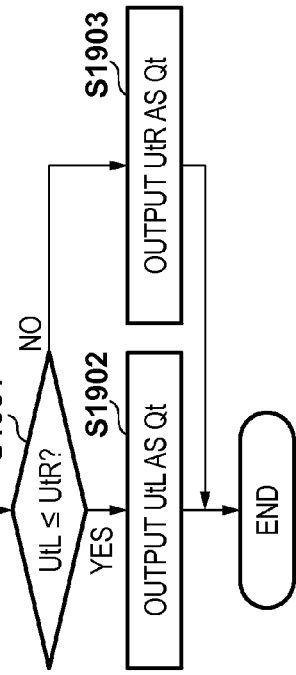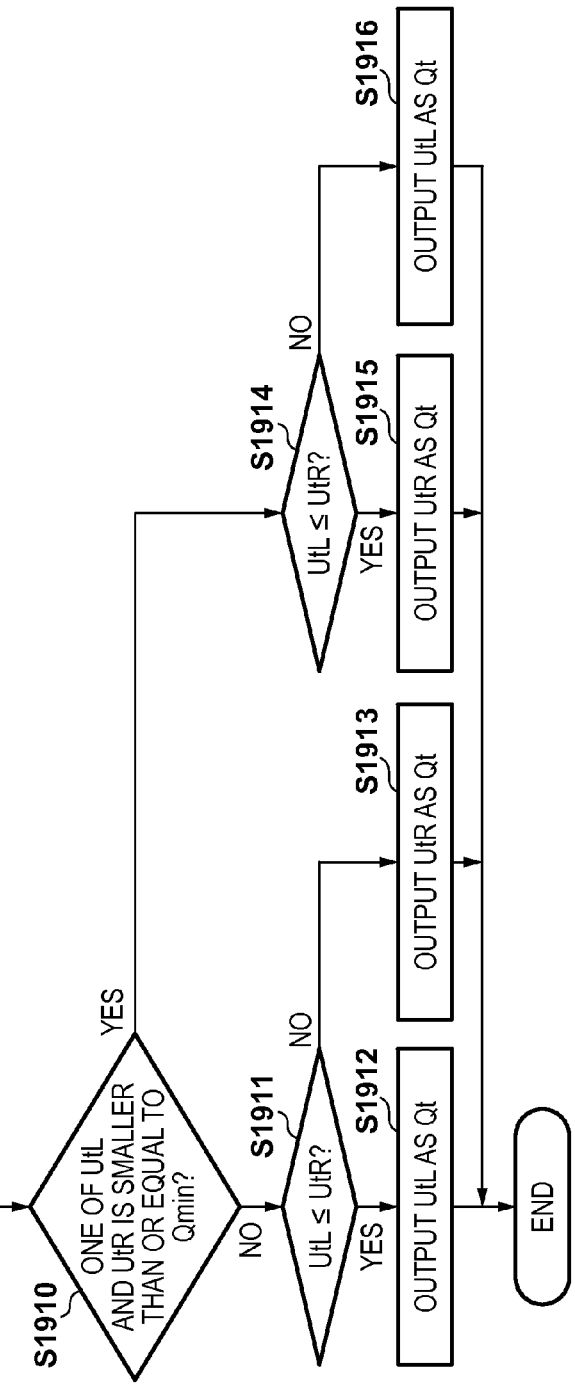
F I G. 19A
F I G. 19B

ELECTRONIC DEVICE AND CONTROL METHOD

BACKGROUND OF THE INVENTION

1. Field of the Invention

The present invention relates to an electronic device and a control method.

2. Description of the Related Art

Recent imaging apparatuses, which are typified by digital cameras, have a function of recording not only still images but also moving images with sound. That is to say, a moving image obtained by successively imaging an object on a time axis can be recorded together with data of sound around the object in a storage medium such as a memory card. Sound to be recorded, such as the sound around the object, will be hereinafter referred to as "environmental sound".

The imaging apparatuses can focus and zoom in on an object during imaging by moving an optical lens. However, a driving sound is generated at the time of driving for moving the optical lens. Housings of the recent digital cameras have been becoming smaller and smaller, and the distance between the source of the driving sound and a microphone in each digital camera is short. For this reason, the microphone in the digital camera acquires the driving sound, and as a result, the driving sound is likely to become noise, which overlaps the environmental sound.

Conventionally, a technique called a "spectral subtraction method" for reducing the aforementioned noise is known in Japanese Patent Laid-Open No. 2006-279185. This spectral subtraction method will now be briefly described with reference to FIG. 21. FIG. 21 is a part of a block configuration of a digital camera. This apparatus is constituted by a control unit 2109 that controls the overall apparatus, an operation unit 2110 that accepts an instruction from a user, an optical lens, a lens control unit, and the like. Furthermore, this apparatus is constituted by an imaging unit 2101 that performs imaging and obtains image data, a microphone 2205, an audio input unit 2102 that acquires sound as audio data, and a memory 2103 that stores the image data and the audio data. Note that the image data and the audio data stored in the memory 2103 are usually subjected to a coding process and stored as coded data in a storage medium.

In a time period in which a moving image with sound is recorded, upon the control unit 2109 detecting an instruction to zoom in or zoom out or the like from a user via the operation unit 2110, the control unit 2109 controls the imaging unit 101 so as to change the position of the optical lens. In accordance with this, the imaging unit 2101 drives a driving source such as a motor in order to change the position of the optical lens. At this time, the microphone 2205 picks up the driving sound of the optical lens, and the sound data consequently obtained from the microphone 2205 is data in which the environmental sound and the driving sound (noise) are combined. The audio input unit 2102 shown in FIG. 21 has a function of reducing this driving sound.

The sound detected by the microphone 2205 is converted into 16-bit digital data (hereinafter referred to as sound data) at a sampling rate of 48 kHz, for example, by an ADC (analog-digital converter) 2206. An FFT 2207 performs an FFT (fast Fourier transform) process on the sound data (e.g., 1024 samples of sound data) arrayed in time series to convert the sound data into data at each frequency (amplitude spectrum). A noise reduction unit 2200 performs a noise reduction process by subtracting noise data at each frequency from data at the corresponding frequency. For this reason, the noise reduction unit 2200 has a profile storing unit 2210 that stores, in advance, amplitude data (noise profile) of noise at each frequency, and an amplitude spectrum subtracting unit 2211. The amplitude spectrum subtracting unit 2211 subtracts amplitude data of noise at each frequency recorded in the profile storing unit 2210 from the amplitude spectrum. Thereafter, the amplitude spectrum from which the noise has been subtracted is subjected to an inverse FFT process at an IFFT 2214, and is reverted to original time-series sound data. Thereafter, an audio processing unit 2216 performs various processes on this sound data. Then, an ALC (auto level controller) 2217 adjusts the level of the sound data, and a result thereof is stored in the memory 2103.

The summary of the "spectral subtraction method" is as described above. As mentioned above, it is desirable that the noise profile stored in advance in the profile storing unit 2210 represents the driving sound that is actually generated in the imaging unit 2101.

In the case of applying the technique described in Japanese Patent Laid-Open No. 2006-279185 to an imaging apparatus, an error occurs between the driving sound that is actually generated in the imaging apparatus and the driving sound indicated by the noise profile stored in advance, due to the following factors.

An individual difference in sound noise generation in drive units such as a motor and a gear A difference in sound noise due to an assembled state of the imaging apparatus A difference in sound noise due to a zoom position Abrasion and aged deterioration of parts Temperature conditions at the time of operation Posture of the imaging apparatus Replacement of parts in the drive unit or the recording unit after the apparatus is shipped to market, as in the case of handling a failure For this reason, it is difficult to reduce noise using one noise profile stored in advance, and there has been a problem in that it is difficult to acquire sound from which noise has been accurately reduced.

SUMMARY OF THE INVENTION

In view of the foregoing problem, the present invention can acquire sound from which noise has been accurately reduced.

According to an aspect of the present invention, at least one of the above-described drawbacks and disadvantages can be overcome.

According to another aspect of the present invention, there is provided an electronic device comprising a first microphone unit; a second microphone unit; an input unit that inputs a drive instruction to drive a drive unit; a first transforming unit that acquires a first audio spectrum by performing Fourier transform on audio data obtained by the first microphone unit; a second transforming unit that acquires a second audio spectrum by performing Fourier transform on audio data obtained by the second microphone unit; a first subtracting unit that subtracts a first noise spectrum from the first audio spectrum so as to reduce noise in audio data obtained by the first microphone unit if the drive instruction is input, wherein the first noise spectrum is generated after the drive instruction is input, using the audio data obtained by the first microphone unit; a second subtracting unit that subtracts a second noise spectrum from the second audio spectrum so as to reduce noise in audio data obtained by the second microphone unit if the drive instruction is input, wherein the second noise spectrum is generated after the drive instruction is input, using the audio data obtained by the second microphone unit; a control unit that selects one of a third audio spectrum and a fourth audio spectrum in accordance with a result of comparison between the third audio spectrum and the fourth audio spectrum, wherein the third audio spectrum is acquired by subtracting the first noise spectrum from the first audio spectrum, and the fourth audio spectrum is acquired by subtracting the second noise spectrum from the second audio spectrum; a third transforming unit that acquires first audio data by performing inverse Fourier transform on the audio spectrum selected from among the third audio spectrum and the fourth audio spectrum; a fourth transforming unit that acquires second audio data by performing inverse Fourier transform on the audio spectrum selected from among the third audio spectrum and the fourth audio spectrum; and a storing unit that stores the first audio data and the second audio data.

According to another aspect of the present invention, there is provided a control method for controlling an electronic device, wherein the electronic device has a first microphone unit and a second microphone unit, the control method comprising: acquiring a first audio spectrum by performing Fourier transform on audio data obtained by the first microphone unit; acquiring a second audio spectrum by performing Fourier transform on audio data obtained by the second microphone unit; acquiring a third audio spectrum by subtracting a first noise spectrum from the first audio spectrum so as to reduce noise in audio data obtained by the first microphone unit if a drive instruction to drive a drive unit is input, wherein the first noise spectrum is generated after the drive instruction is input, using the audio data obtained by the first microphone unit; acquiring a fourth audio spectrum by subtracting a second noise spectrum from the second audio spectrum so as to reduce noise in audio data obtained by the second microphone unit if the drive instruction is input, wherein the second noise spectrum is generated after the drive instruction is input, using the audio data obtained by the second microphone unit; selecting one of the third audio spectrum and the fourth audio spectrum in accordance with a result of comparison between the third audio spectrum and the fourth audio spectrum; acquiring first audio data by performing inverse Fourier transform on the audio spectrum selected from among the third audio spectrum and the fourth audio spectrum; acquiring second audio data by performing inverse Fourier transform on the audio spectrum selected from among the third audio spectrum and the fourth audio spectrum; and storing the first audio data and the second audio data.

Further features of the present invention will become apparent from the following description of exemplary embodiments with reference to the attached drawings.

BRIEF DESCRIPTION OF THE DRAWINGS

FIGS. 18A to 18C are timing charts showing exemplary post-processes in an embodiment.

FIGS. 19A to 19C are flowcharts showing exemplary post-processes in an embodiment.

DESCRIPTION OF THE EMBODIMENTS

Various exemplary embodiments, features, and aspects of the present invention will be described in detail below with reference to the drawings.

An embodiment of the present invention will be described below in detail with reference to the drawings. Note that an imaging apparatus 100, which is a digital camera or the like, will be taken as an example of an electronic device in the following description of the embodiment. However, the electronic device is not limited to the imaging apparatus 100, and may be any apparatus having a microphone, such as a mobile phone or an IC recorder.

Figure 1:
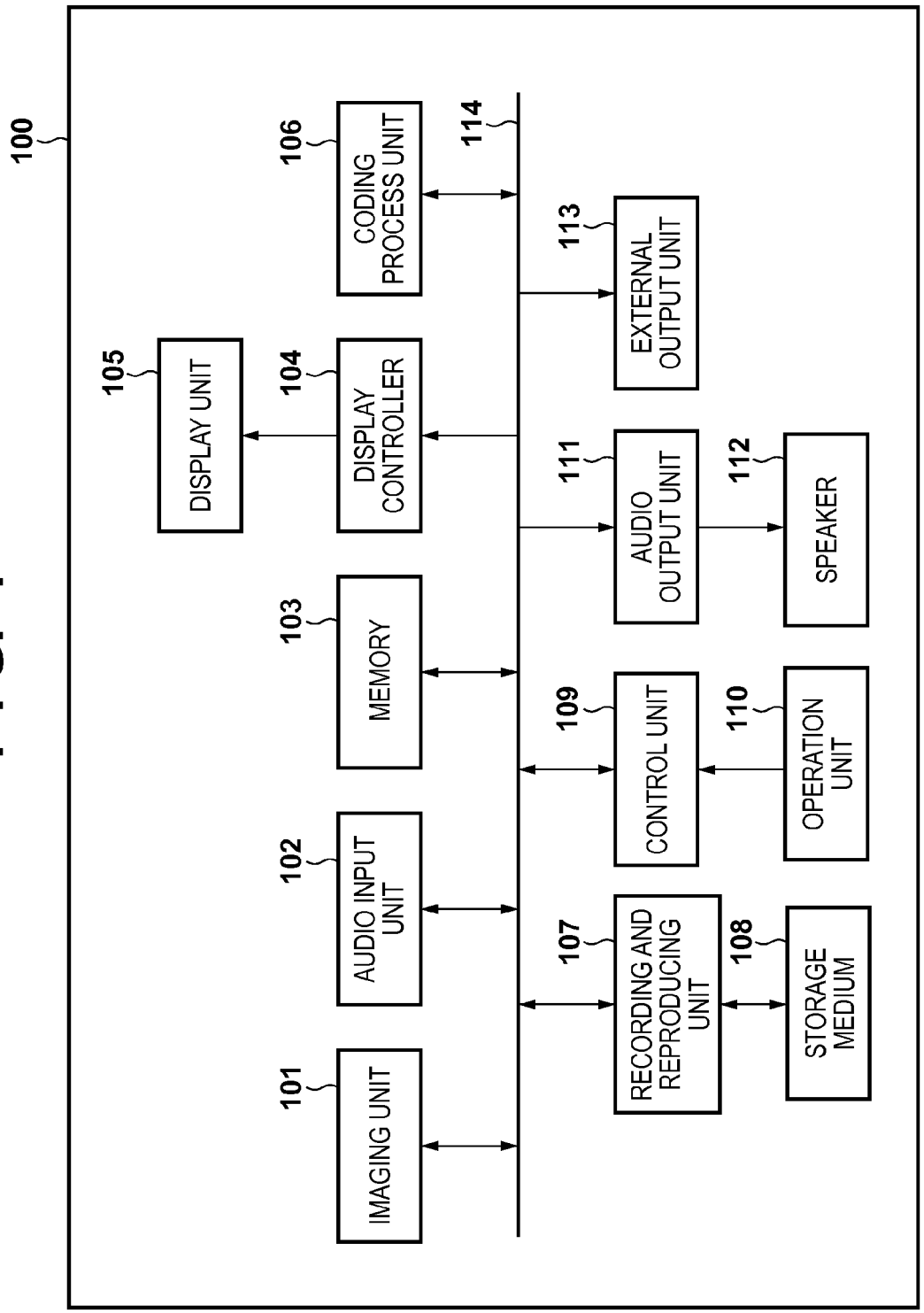
FIG. 1 is a block diagram showing an exemplary imaging apparatus in an embodiment.

FIG. 1 is a block diagram showing an exemplary configuration of the imaging apparatus 100. The imaging apparatus 100 has an imaging unit 101, an audio input unit 102, a memory 103, a display controller 104, a display unit 105, a coding processing unit 106, a recording and reproducing unit 107, a storage medium 108, and a control unit 109. Furthermore, the imaging apparatus 100 has an operation unit 110, an audio output unit 111, a speaker 112, an external output unit 113, and a system bus 114 that connects constituent elements to one another.

The imaging unit 101 converts an optical image of an object into an image signal, performs image processes on the image signal, and generates image data. The audio input unit 102 acquires sound around the imaging apparatus 100, performs audio processes on the acquired sound, and generates audio data.

The memory 103 stores the image data supplied from the imaging unit 101, and the audio data supplied from the audio input unit 102. The display controller 104 displays the image data obtained from the imaging unit 101, a menu screen of the imaging apparatus 100, and the like on the display unit 105. The coding processing unit 106 performs predetermined coding on the image data stored in the memory 103, and generates compressed image data. The coding processing unit 106 also performs predetermined coding on the audio data stored in the memory 103, and generates compressed audio data. The recording and reproducing unit 107 records, in the storage medium 108, at least one of the compressed image data and the compressed audio data generated by the coding processing unit 106, and compressed moving image data. The recording and reproducing unit 107 also reads out, from the storage medium 108, at least one of the image data, the audio data, and the moving image data recorded in the storage medium 108.

The control unit 109 controls each part of the imaging apparatus 100 via the system bus 114. The control unit 109 has a CPU and a memory. A program for controlling each part of the imaging apparatus 100 is recorded in the memory in the control unit 109.

The operation unit 110 accepts an operation for inputting an instruction from a user to the imaging apparatus 100. The operation unit 110 transmits a signal corresponding to a specific operation performed by the user to the control unit 109. The operation unit 110 has a button for giving an instruction to shoot a still image, a recording button for giving an instruction to start and stop recording of a moving image, a zoom button for giving the imaging apparatus 100 an instruction to optically perform a zoom operation for an image, and the like. Furthermore, the operation unit 110 has a mode selection button for selecting an operation mode of the imaging apparatus 100 from among a still image shooting mode, a moving image shooting mode, and a reproduction mode.

The audio output unit 111 outputs the audio data read out by the recording and reproducing unit 107 to the speaker 112. An external output unit 113 outputs the audio data read out by the recording and reproducing unit 107 to an external device.

Next, an operation in the case where the imaging apparatus 100 is in the moving image shooting mode will be described. When the imaging apparatus 100 is in the moving image shooting mode, the control unit 109 controls the imaging unit 101 so as to perform imaging at a predetermined frame rate and controls the audio input unit 102 so as to acquire audio data, in accordance with the recording button of the operation unit 110 having been turned on. In this case, the data of the image captured by the imaging unit 101 and the audio data are compressed and recorded as moving image data in the storage medium 108 by the recording and reproducing unit 107. Thereafter, the control unit 109 performs a closing process on the moving image data recorded in the storage medium 108 in accordance with the recording button of the operation unit 110 having been turned off, and generates one moving image file. When the imaging apparatus 100 is in the moving image shooting mode, it should be noted that the recording button of the operation unit 110 is in an off state until the recording button of the operation unit 110 is turned on by the user.

Figure 20:
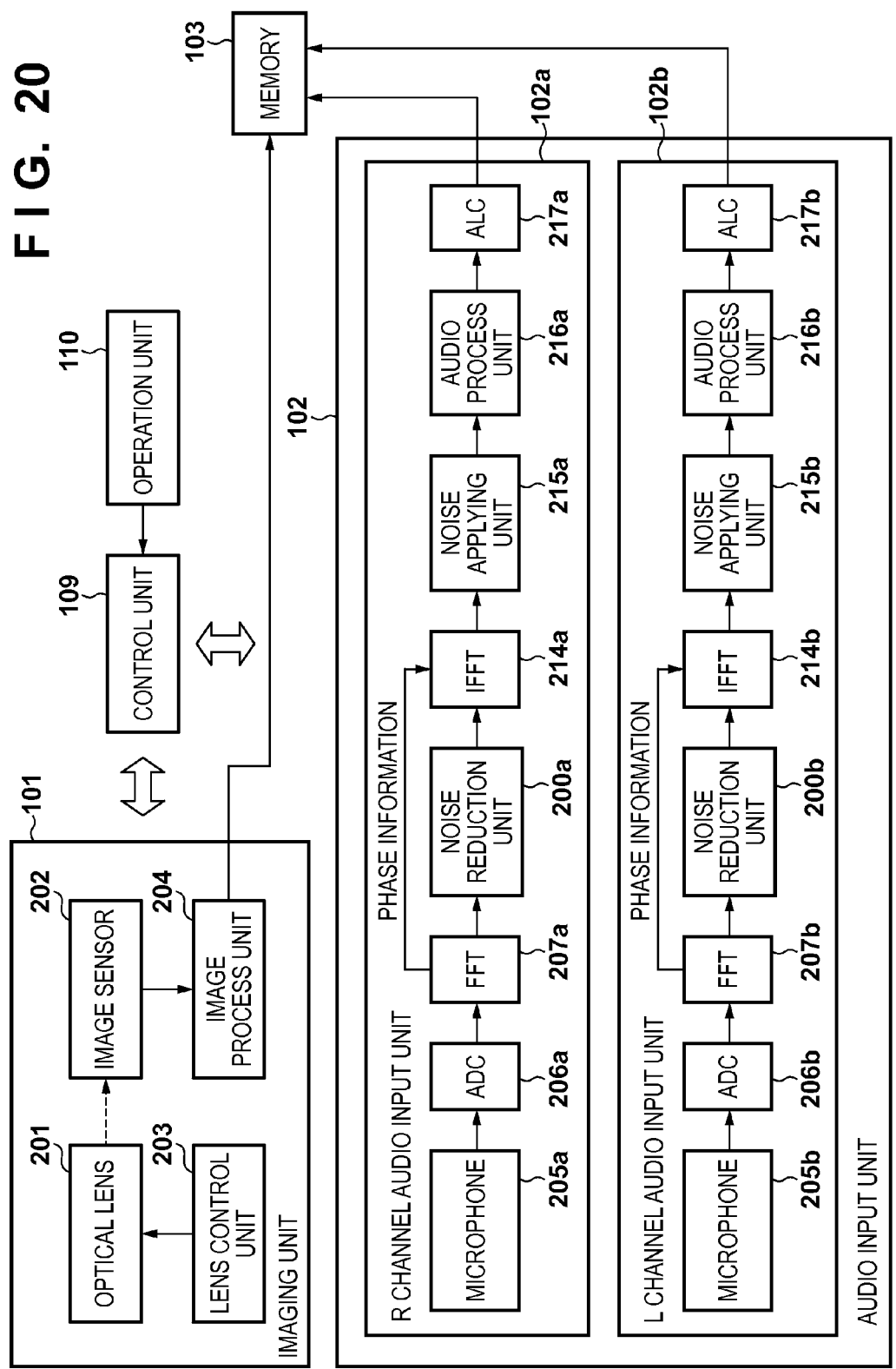
FIG. 20 is a block diagram showing an exemplary audio input unit in an embodiment.
Figure 21:
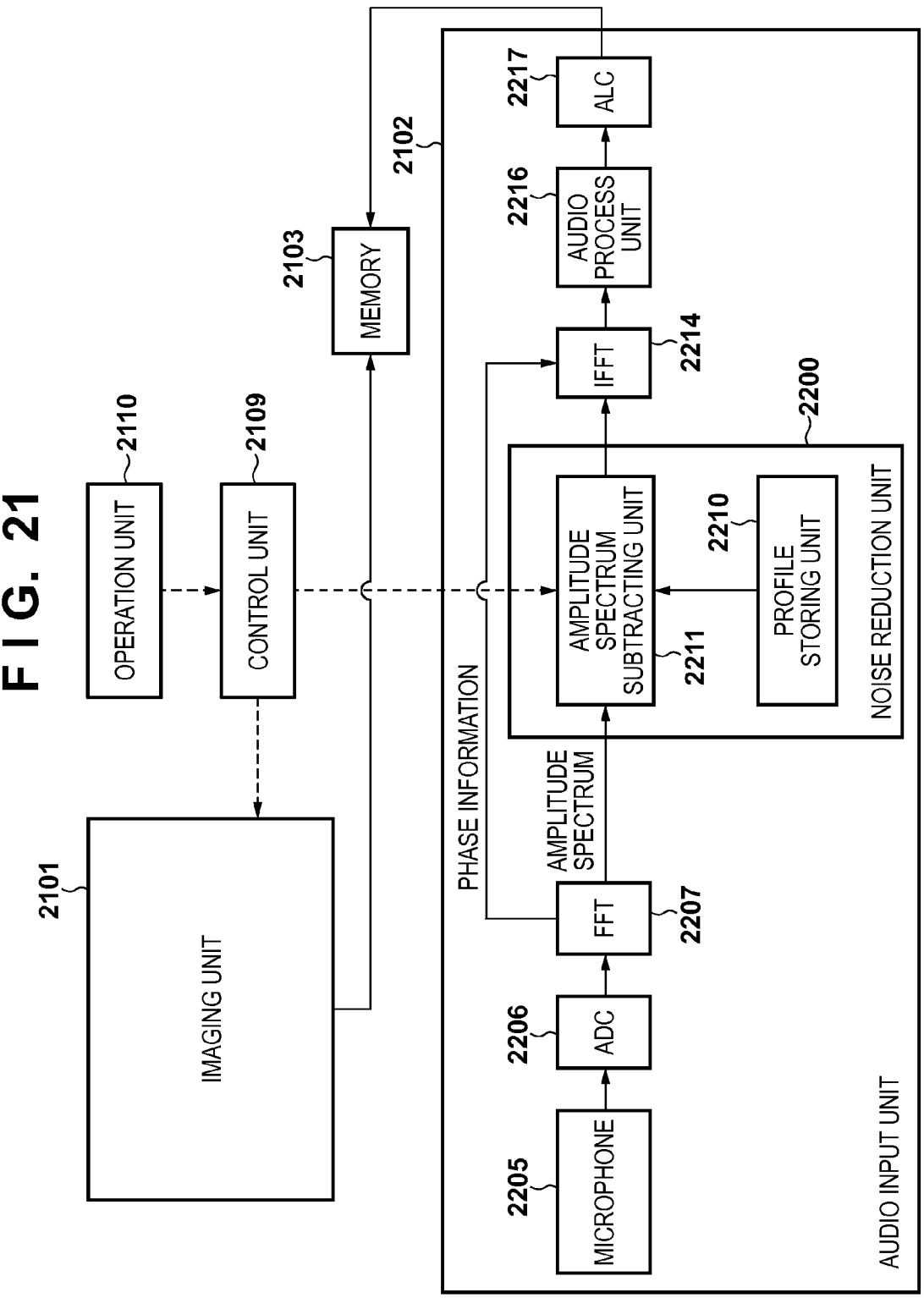
FIG. 21 is a block diagram showing an exemplary conventional imaging apparatus.

FIG. 20 shows a relationship between the imaging unit 101 and the audio input unit 102.

The imaging unit 101 has an optical lens 201, an image sensor 202, a lens control unit 203, and an image processing unit 204.

The optical lens 201 is a focusing lens, a zoom lens, or the like for optically focusing on an object. The optical lens 201 can optically perform zooming. Hereinafter, to optically perform zooming using the optical lens 201 will be referred to as a "zoom operation". The zoom operation is for zooming in on an optical image of the object by the lens control unit 203 moving the optical lens 201 in accordance with an instruction from the control unit 109. The image sensor 202 converts the optical image of the object into an image signal, and outputs the image signal. The lens control unit 203 drives a motor or the like for moving the optical lens 201. The image processing unit 204 performs image processes on the image signal output from the image sensor 202, and generates image data.

For example, if an instruction to cause the imaging apparatus 100 to start the zoom operation, focus adjustment, or the like is input via the operation unit 110, the control unit 109 changes the status of the zoom control signal for controlling the lens control unit 203 to an "ON" state so as to move the optical lens 201. If the status of the zoom control signal is changed to the "ON" state, the lens control unit 203 drives the motor or the like and moves the optical lens 201.

When the lens control unit 203 moves the optical lens 201, noise accompanying the movement of the optical lens 201 and noise accompanying the driving of the motor for moving the optical lens 201 are generated in the imaging apparatus 100. Hereinafter, the noise accompanying the movement of the optical lens 201 and the noise accompanying the driving of the motor for moving the optical lens 201 will be referred to as "driving noise".

Although a description has been given while assuming that the optical lens 201 and the lens control unit 203 are included in the imaging apparatus 100 in FIG. 20, it should be noted that the invention is not limited thereto. The optical lens 201 and the lens control unit 203 may be attachable to and detachable from the imaging apparatus 100.

In order to achieve stereo recording, the audio input unit 102 in the imaging apparatus 100 has an R (Right) channel audio input unit 102a and an L (Left) channel audio input unit 102b. Since the R channel audio input unit 102a and the L channel audio input unit 102b have the same configuration, the configuration of the R channel audio input unit 102a will be described below. The R channel audio input unit 102a has a microphone 205a, an ADC 206a, an FFT 207a, a noise reduction unit 200a, an IFFT 214a, a noise applying unit 215a, an audio processing unit 216a, and an ALC 217a. Note that an R channel and an L channel will be hereinafter referred to as an "Rch" and an "Lch", respectively.

The microphone 205a converts sound vibration into an electric signal, and outputs an analog audio signal. An ADC (analog-digital converter) 206a converts the analog audio signal obtained by the microphone 205a into a digital audio signal. For example, the ADC 206a has a sampling frequency of 48 KHz, and outputs 16-bit time-series digital data per sample. The FFT (fast Fourier transformer) 207a inputs, as one frame, 1024 samples of audio data that are output from the ADC 206a and arrayed in time-series, for example. The FFT 207a then performs fast Fourier transform process on the audio data for one frame, generates an amplitude level (amplitude spectrum data) at each frequency, and supplies the generated amplitude level to the noise reduction unit 200a. It is assumed that the amplitude spectrum generated by the FFT 207a is constituted by amplitude data at respective frequencies of 1024 points from 0 to 48 KHz. Although 1024 samples of audio data constitute one frame in this embodiment, first-half 512 samples of data in one frame to be processed next and latter-half 512 samples of data in the previous one frame are the same and overlap each other in part.

The noise reduction unit 200a subtracts the amplitude data of noise at each frequency that indicates the driving noise generated when the imaging apparatus 100 is executing the zoom operation, from the amplitude data at the corresponding frequency output from the FFT 207a. The noise reduction unit 200a supplies the amplitude spectrum data after the subtraction is performed to the IFFT (inverse fast Fourier transformer) 214a.

The IFFT (inverse fast Fourier transformer) 214a performs inverse fast Fourier transform (inverse transform) process on the amplitude spectrum supplied from the noise reduction unit 200a using phase information supplied from the FFT 207a, and thereby generates audio data in the original time-series format. The IFFT 214a changes the amplitude spectrum data into the time-series audio signal using the phase information regarding the phase of the audio data before being subjected to the fast Fourier transform by the FFT 207a.

The noise applying unit 215a applies a noise signal to the time-series audio signal supplied from the IFFT 214a. It is assumed that the noise signal applied by the noise applying unit 215a is a signal of the noise floor level. The audio processing unit 216a performs a process for reducing wind noise, a process for enhancing stereophonic impression, an equalizer process, and the like. Then, the ALC (auto gain controller) 217a adjusts the amplitude of the time-series audio signal at a predetermined level, and outputs the adjusted audio data to the memory 103.

Next, the noise reduction unit 200a in the R channel audio input unit 102a in the embodiment will be described below using FIG. 2.

Figure 2:
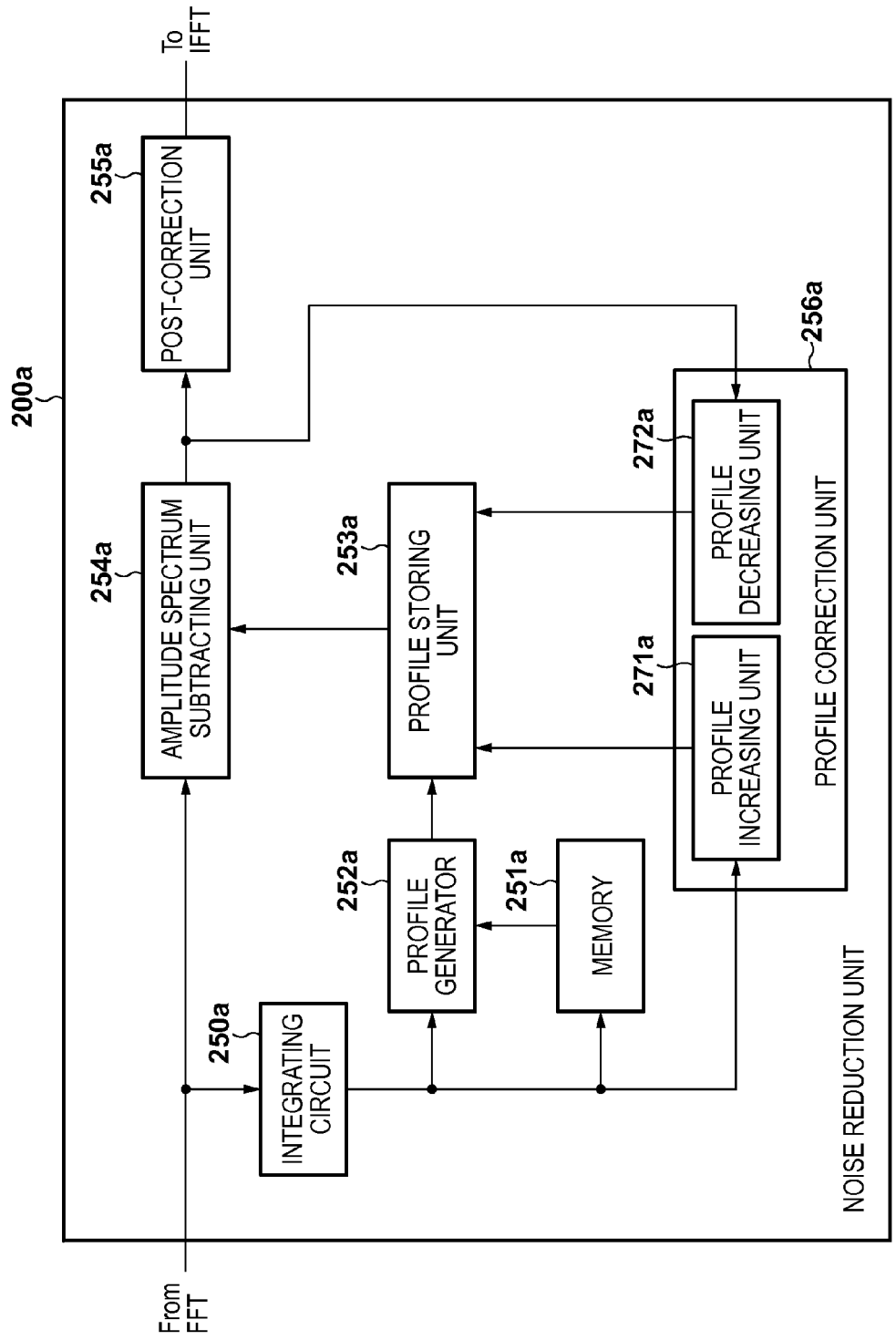
FIG. 2 is a block diagram showing an exemplary configuration of a noise reduction unit in an embodiment.

FIG. 2 is a block diagram showing an exemplary configuration of the noise reduction unit 200a. The noise reduction unit 200a has an integrating circuit 250a, a memory 251a, a profile generator 252a, a profile storing unit 253a, an amplitude spectrum subtracting unit 254a, a post-correction unit 255a, and a profile correction unit 256a.

The noise reduction unit 200a performs an operation for reducing the driving noise generated when the imaging apparatus 100 is performing the zoom operation. The operation performed by the noise reduction unit 200a will now be described with reference to FIG. 4.

Figure 4:
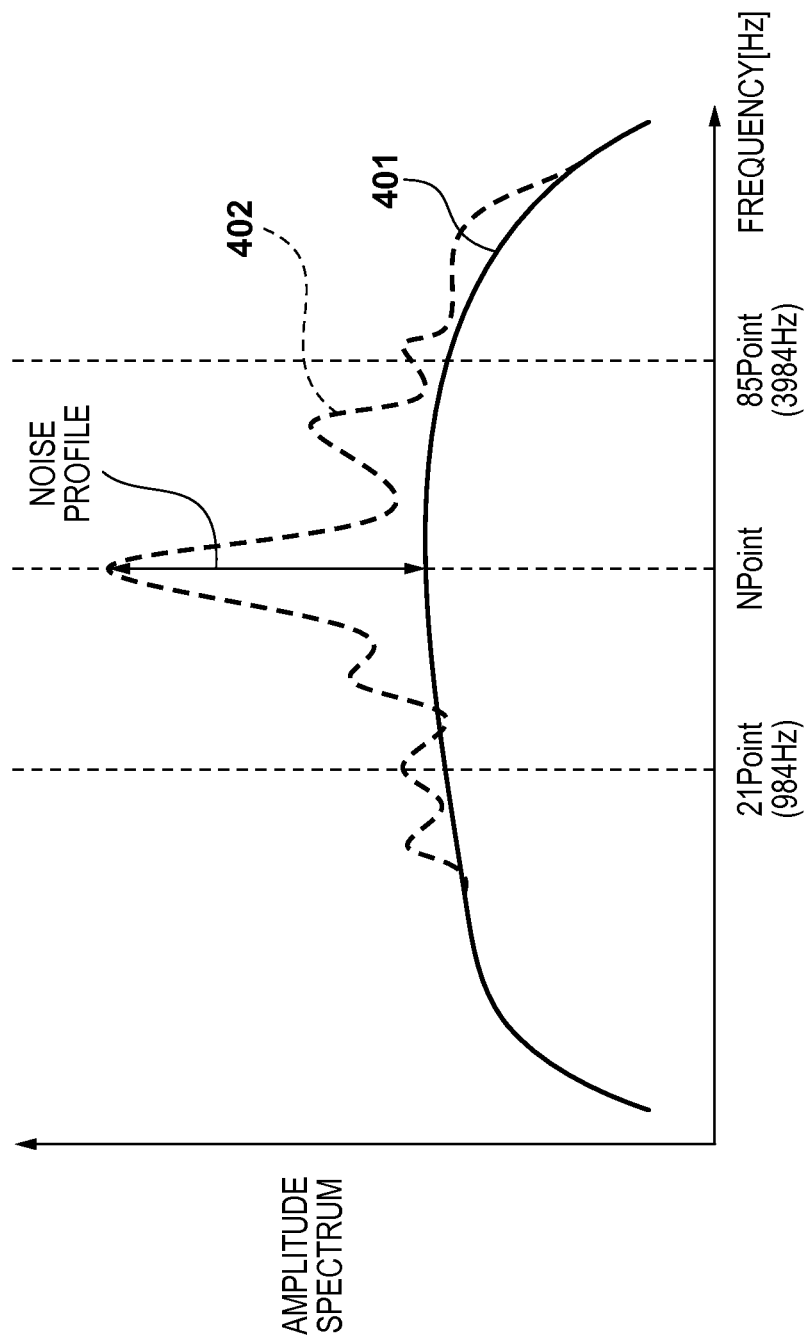
FIG. 4 is a diagram showing exemplary amplitude spectra at each frequency before a zoom operation and during the zoom operation in an embodiment.

FIG. 4 is a diagram showing exemplary amplitude spectra at each frequency before the zoom operation is performed by the imaging apparatus 100 and while the zoom operation is being performed by the imaging apparatus 100. The horizontal axis in FIG. 4 indicates the frequency, and indicates 1024 points in a zone from 0 to 48 KHz (where it is assumed that a frequency spectrum of 512 points is given up to 24 kHz, which is the Nyquist frequency). 401 in FIG. 4 denotes an amplitude spectrum indicating the environmental sound before the imaging apparatus 100 performs the zoom operation (in a state where the optical lens 201 is not moving). 402 in FIG. 4 denotes an amplitude spectrum indicating the environmental sound in the case where the imaging apparatus 100 is performing the zoom operation (in a state where the optical lens 201 is moving). The amplitude spectrum denoted by 402 includes the driving noise. The noise reduction unit 200a creates a noise profile to be used to reduce the driving noise, from a difference between the amplitude spectrum denoted by 401 and the amplitude spectrum denoted by 402. Each part of the noise reduction unit 200a will be described below.

The integrating circuit 250a integrates an amplitude value at each frequency of the amplitude spectrum resulting from the fast Fourier transform by the FFT 207a on the time axis, in accordance with an instruction from the control unit 109. At this time, the integrating circuit 250a counts the number of integrated frames. The amplitude value at a frequency fi (where i=any of 0, 1, . . . , 1023) in the amplitude spectrum data obtained from one frame from the FFT 207a is expressed as A(fi). In this case, the integrating circuit 250a obtains an integration value (cumulative addition value) S(fi) at each frequency, as indicated by the following equation.

$$S(fi)=\Sigma A(fi)$$

If the lens control unit 203 is not moving the optical lens 201, the integrating circuit 250a integrates the amplitude value at each frequency as described above. Then, the integrating circuit 250a outputs a result of dividing the integration value at each frequency by the number of frames n, which represents an integration period. That is to say, the integrating circuit 250a calculates an average amplitude value Aave(fi) at each frequency as indicated by the following equation, and outputs a result of this calculation.

$$Aave(fi)=S(fi)/n$$

Data indicated by the average amplitude value Aave(fi) (i=0, 1, . . . , 1023) corresponds to the amplitude spectrum denoted by 401 in FIG. 4. The integrating circuit 250a stores the calculated average amplitude value Aave(fi) in the memory 251a.

The integrating circuit 250a integrates the amplitude value at each frequency as described above until a stabilization period passes after the lens control unit 203 starts to move the optical lens 201. The stabilization period is a period until the amplitude spectrum input to the integrating circuit 250a stabilizes in accordance with the time constant of the integrating circuit 250a. Until the stabilization period passes, the amplitude spectrum output from the FFT 207a contains the driving noise. When the stabilization period (which is assumed to correspond to m frames, for example) has passed, the integrating circuit 250a outputs S(fi)/m to the profile generator 252a. S(fi)/m corresponds to the amplitude spectrum denoted by 402 in FIG. 4.

The profile generator 252a subtracts S(fi)/n stored in the memory 251a from S(fi)/m supplied from the integrating circuit 250a as indicated by the following equation, and thereby calculates N(fi) that is the amplitude value corresponding to the driving noise at each frequency.

$$N(fi)=S(fi)/m-S(fi)/n$$

After N(fi) is calculated, the profile generator 252a stores N(fi) as a noise profile in the profile storing unit 253a. The noise profile is data indicating the driving noise generated when the zoom operation is being performed.

Thereafter, the amplitude spectrum subtracting unit 254a performs a process for subtracting the amplitude value N(fi) of the driving noise read out from the profile storing unit 253a from A(fi) of the amplitude spectrum supplied from the FFT 207a. Note that the process for subtracting the amplitude value N(fi), which is the noise profile read out from the profile storing unit 253a, from A(fi) of the amplitude spectrum supplied from the FFT 207a will be hereinafter referred to as a "subtraction process". The amplitude spectrum subtracting unit 254a outputs an amplitude spectrum $A_{NR}(fi)$ obtained by the following equation to the IFFT 214a or the IFFT 214b.

$$A_{NR}(fi)=A(fi)-N(fi)$$

Note that a state where the creation of the noise profile by the profile generator 252a has not been finished occurs in a period from when the instruction to start the zoom operation is given to the imaging apparatus 100 by the user until the stabilization period passes. For this reason, "m" needs to be set small in order to shorten the period until the creation of the noise profile by the profile generator 252a is finished. However, if "m" is extremely small, there is a possibility that the accuracy of reduction of the driving noise using the noise profile decreases. When the lens control unit 203 starts the control for moving the optical lens 201, sound of the optical lens 201 starting to move, sound fluctuation, and the like that are kinds of the driving noise are generated for about 70 ms. In order to reduce the sound of the optical lens 201 starting to move, sound fluctuation, and the like, "m" is set to "15", for example, so as to cause the profile generator 252a to generate the noise profile in a period longer than 70 ms.

In the embodiment, although one frame is constituted by 1024 samples of time-series audio data, a half of one frame overlaps a half of another frame. Also, since the sampling rate of the audio data is set to 48 kHz, a noise profile creation period T is as follows if m=15.

$$T=a \text{ period for } m \text{ frames}=m\times(1024/2)/48 \text{ kHz}=160 \text{ ms}$$

The profile generator 252a generates the noise profile in a period from when the instruction to start the zoom operation is given to the imaging apparatus 100 by the user until the creation period T passes. For this reason, the profile generator 252a can generate an accurate noise profile for reducing the sound of the optical lens 201 starting to move, sound fluctuation, and the like.

The post-correction unit 255a corrects the amplitude spectrum after being subjected to the subtraction process by the amplitude spectrum subtracting unit 254a, and outputs the corrected amplitude spectrum to the IFFT 214a.

The profile correction unit 256a performs a process for correcting the noise profile stored in the profile storing unit 253a in accordance with the volume of the environmental sound. Correction of the noise profile performed by the profile correction unit 256a includes increasing correction and decreasing correction. The profile correction unit 256a has a profile increasing unit 271a that performs the increasing correction of the noise profile and a profile decreasing unit 272a that performs the decreasing correction of the noise profile.

The increasing correction of the noise profile refers to correction for increasing the amplitude spectrum of the noise profile generated by the profile generator 252a or the noise profile corrected by the profile correction unit 256a. That is to say, the amplitude spectrum $A_{NR}(fi)$ after being subjected to the subtraction process by the amplitude spectrum subtracting unit 254a becomes small as a result of performing the increasing correction of the noise profile. The decreasing correction of the noise profile refers to correction for decreasing the amplitude spectrum of the noise profile generated by the profile generator 252a or the noise profile corrected by the profile correction unit 256a. That is to say, the amplitude spectrum $A_{NR}(fi)$ after being subjected to the subtraction process by the amplitude spectrum subtracting unit 254a becomes large as a result of performing the decreasing correction of the noise profile. The correction of the noise profile performed by the profile correction unit 256a is performed for the amplitude spectrum $A(fi)$ of each frame supplied from the FFT 207a as necessary. When the zoom operation is being performed by the imaging apparatus 100, the profile correction unit 256a can appropriately correct the noise profile in accordance with a change of the environmental sound and the driving noise.

The L channel audio input unit 102b also has a microphone 205b, an ADC 206b, an FFT 207b, a noise reduction unit 200b, an IFFT 214b, a noise applying unit 215b, an audio processing unit 216b, and an ALC 217b, as the R channel audio input unit 102a does. The microphone 205a and the microphone 205b have the same configuration, the FFT 207a and the FFT 207b have the same configuration, and the noise reduction unit 200a and the noise reduction unit 200b have the same configuration. Furthermore, the IFFT 214a and the IFFT 214b have the same configuration, and the noise applying unit 215a and the noise applying unit 215b have the same configuration. Furthermore, the audio processing unit 216a and the audio processing unit 216b have the same configuration, and the ALC 217a and the ALC 217b have the same configuration. When stereo recording is performed, audio data supplied from the ALC 217a and audio data supplied from the ALC 217b are recorded in the memory 103.

Figure 3:
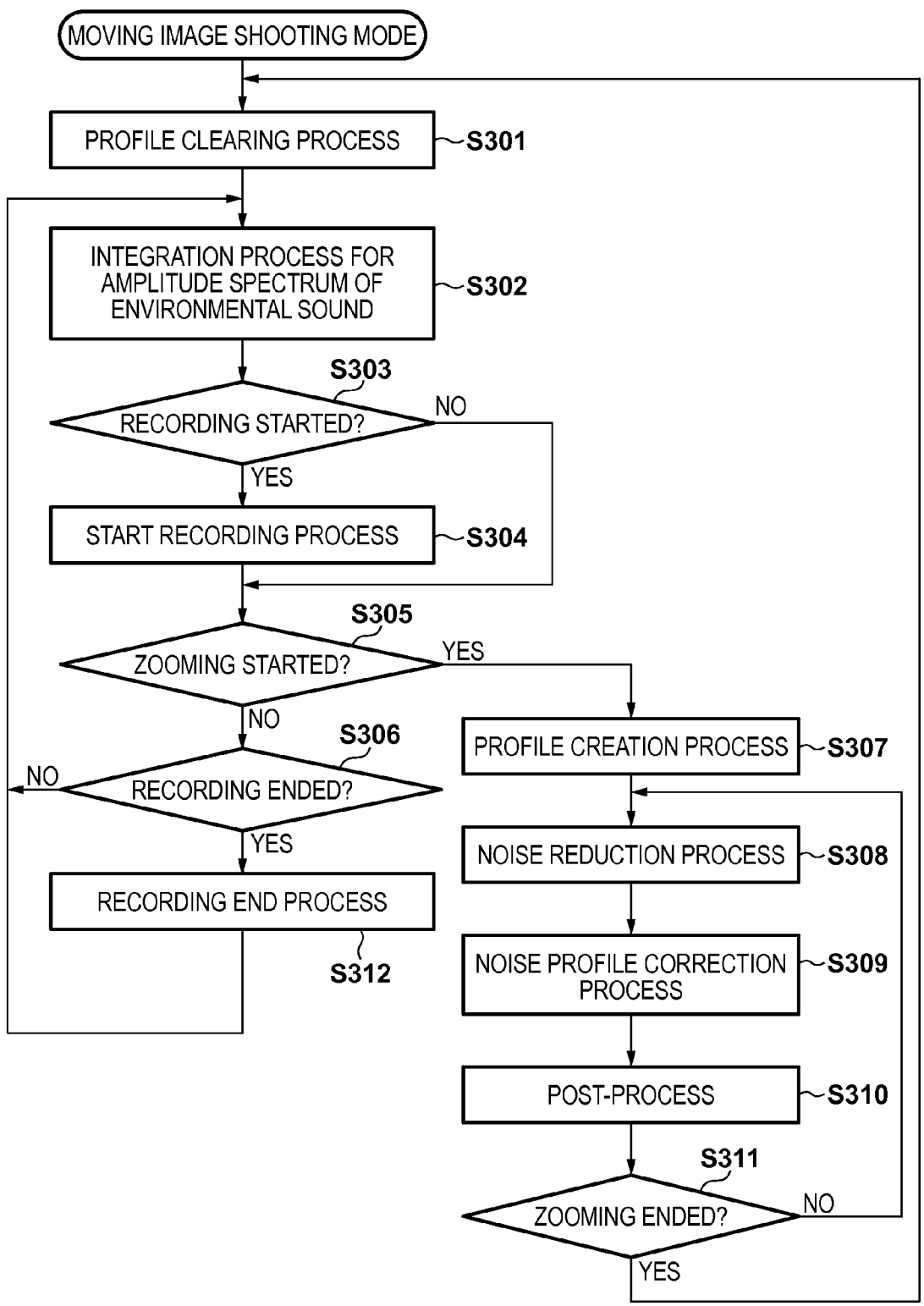
FIG. 3 is a flowchart showing an exemplary moving image recording process in an embodiment.

FIG. 3 is a flowchart showing an exemplary moving image recording process performed by the control unit 109 in the case where the moving image shooting mode is selected as the mode of the imaging apparatus 100. The moving image recording process will be described below, taking, as an example, the case where an analog audio signal is output from the microphone 205a to the ADC 206a.

In the case where the mode of the imaging apparatus 100 is changed to the moving image shooting mode, the control unit 109 clears the profile storing unit 253a in the noise reduction unit 200a to zero (S301). Thereafter, the control unit 109 causes the integrating circuit 250a to start the integration process for the amplitude spectrum input from the FFT 207a (S302). Then, the control unit 109 determines whether or not the recording button of the operation unit 110 has been turned on, i.e., whether or not an instruction to cause the imaging apparatus 100 to start to record moving image data has been input (S303). If the instruction to cause the imaging apparatus 100 to start to record moving image data has been input (Yes in S303), the control unit 109 starts to record moving image data (S304). In this case, the control unit 109 starts a coding process for the image data and the audio data for generating the moving image data that are to be stored in the memory 103 from the imaging unit 101 and the audio input unit 102, and causes the recording and reproducing unit 107 to start the recording in the storage medium 108.

In step S305, the control unit 109 determines whether or not an instruction to start the zoom operation has been input via the operation unit 110. If the instruction to start the zoom operation has not been input via the operation unit 110, the control unit 109 determines whether or not an instruction to cause the imaging apparatus 100 to end the recording of the moving image data has been input via the operation unit 110 (S306). If the instruction to cause the imaging apparatus 100 to end the recording of the moving image data has been input via the operation unit 110 (Yes in S306), the control unit 109 starts to encode the moving image data stored in the memory 103, and causes the coded moving image data to be recorded in the storage medium 108. Furthermore, the control unit 109 performs a closing process for the moving image data stored in the storage medium 108, and finishes the moving image data as a moving image file (S312). If the instruction to cause the imaging apparatus 100 to end the recording of the moving image data has not been input via the operation unit 110 (No in S306), the processing returns from step S306 to step S302.

On the other hand, if the instruction to start the zoom operation has been input from the operation unit 110, the processing proceeds from step S305 to step S307. In step S307, the control unit 109 performs a noise profile creation process in order to cause the noise reduction unit 200*a* to create the noise profile. The noise profile creation process performed in step S307 will be described later. The noise profile created as a result of execution of the noise profile creation process is stored in the profile storing unit 253*a*.

Next, the control unit 109 performs a noise reduction process for reducing the amplitude value at a specific frequency included in the noise profile from the amplitude value at each frequency of the amplitude spectrum resulting from the fast Fourier transform by the FFT 207*a* (S308). In the case of performing the noise reduction process, the control unit 109 controls the amplitude spectrum subtracting unit 254*a* so as to perform the subtraction process. Next, the control unit 109 performs a noise profile correction process for controlling the profile correction unit 256*a* so as to correct the noise profile stored in the profile storing unit 210*a* (S309). The noise profile correction process performed in step S309 will be described later. The noise profile corrected by the profile correction unit 256*a* is applied to the subtraction process for the next frame. Next, if there are an Rch amplitude spectrum obtained after the subtraction process is performed by the amplitude spectrum subtracting unit 254*a* and an Lch amplitude spectrum obtained after the subtraction process is performed by the amplitude spectrum subtracting unit 254*b*, the control unit 109 performs a post-process (S310). The post-process refers to a process for performing correction so as to make the Rch amplitude spectrum and the Lch amplitude spectrum identical to each other. The post-process performed in step S310 will be described later.

It is then determined whether or not an instruction to stop the zoom operation has been input from the operation unit 110 (S311). If the instruction to stop the zoom operation has not been input from the operation unit 110, the zoom operation is continuously executed in the imaging apparatus 100, and accordingly the control unit 109 repeats the processes from step S308 to step S310. If the instruction to stop the zoom operation has been input from the operation unit 110, the control unit 109 stops the zoom operation in the imaging apparatus 100 and returns to the process in step S301.

Note that the moving image recording process in FIG. 3 has been described, taking, as an example, the case where an analog audio signal is output from the microphone 205*a* to the ADC 206*a*. However, in the case where an analog audio signal is output from the microphone 205*b* to the ADC 206*b* as well, the control unit 109 performs recording of a moving image as in the moving image recording process in FIG. 3.

Noise Profile Creation Process (S307)

The noise profile creation process executed by the control unit 109 in step S307 will be described using FIGS. 4, 5, 6, and 7. The noise profile creation process will be described below, taking, as an example, the case where an analog audio signal is output from the microphone 205*a* to the ADC 206*a*.

Figure 5:
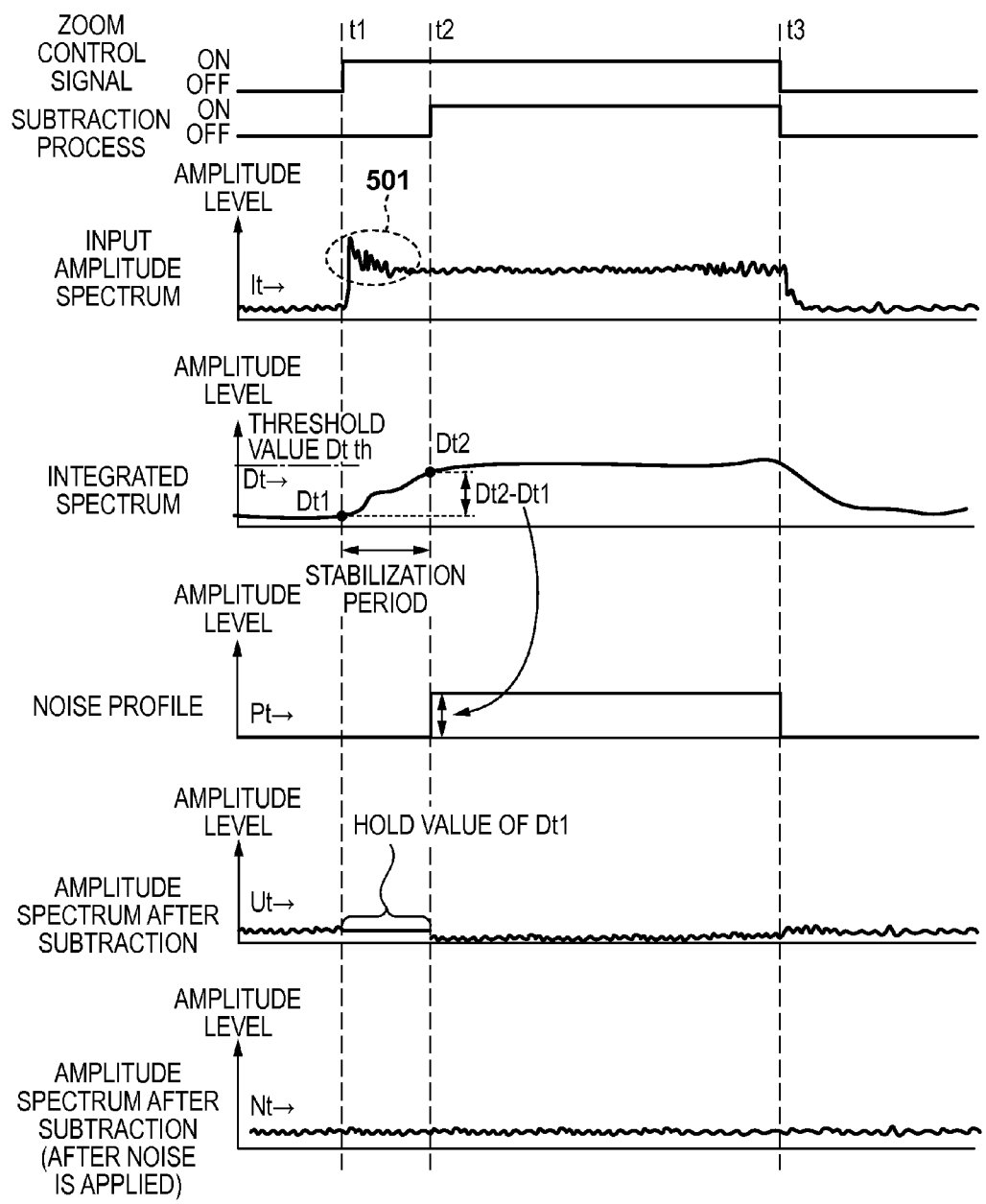
FIG. 5 is an exemplary timing chart showing a noise profile creation process in an embodiment.
Figure 6:
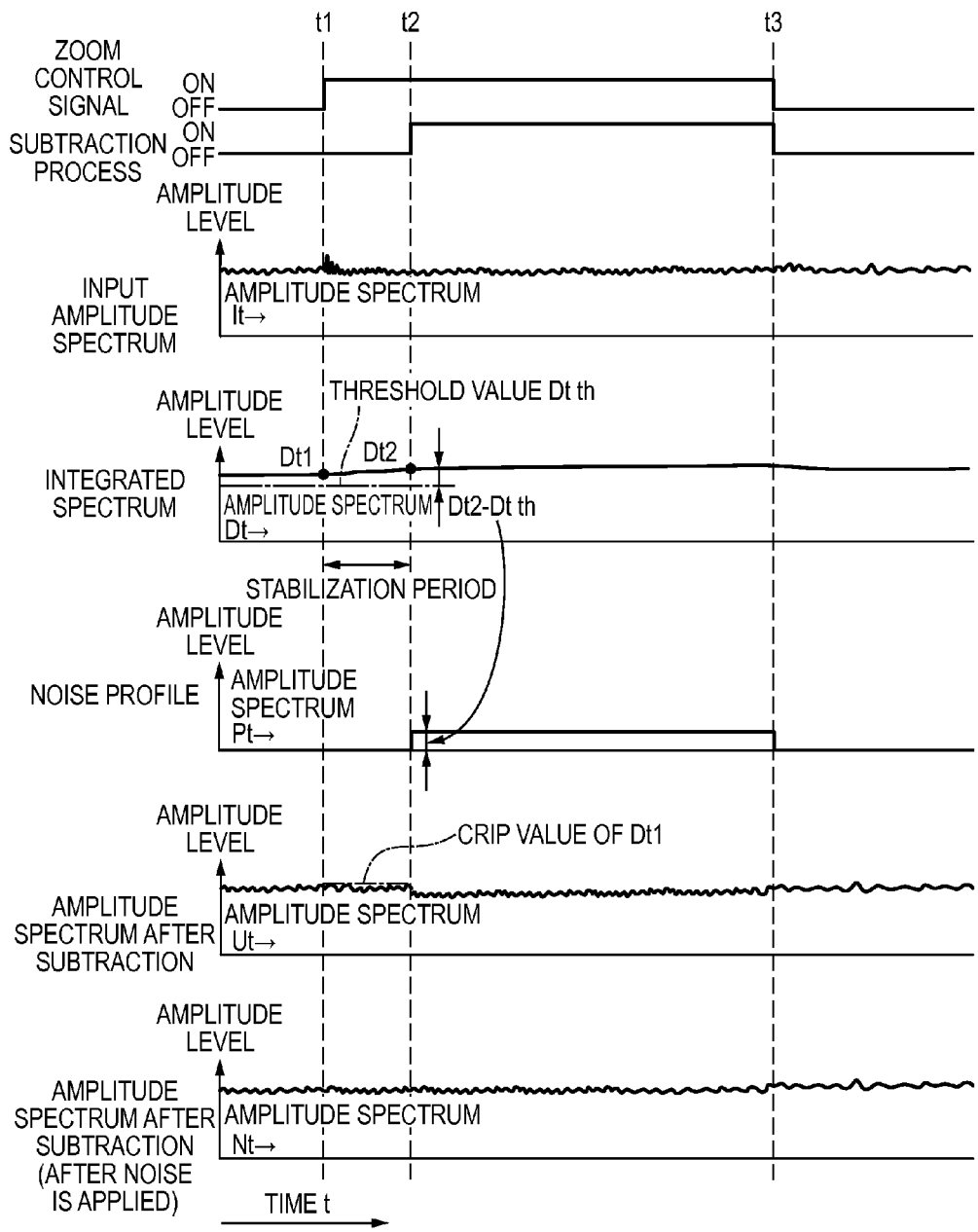
FIG. 6 is an exemplary timing chart showing the noise profile creation process in an embodiment.

FIG. 5 is a timing chart showing the noise profile creation process for the amplitude spectrum at each frequency. FIG. 6 is a timing chart showing the noise profile creation process for the amplitude spectrum at each frequency in the case where the environmental sound before the zoom operation is started by the imaging apparatus 100 is large.

FIGS. 5 and 6 will now be described. In FIGS. 5 and 6, "t1" denotes the time when the control unit 109 controls the lens control unit 203 so as to move the optical lens 201. The control unit 109 changes the status of the zoom control signal to the "ON" state in order to control the lens control unit 203 so as to move the optical lens 201. In the case of not controlling the lens control unit 203 so as to move the optical lens 201, the control unit 109 does not turns on the zoom control signal, and therefore, the zoom control signal is in an "OFF" state in this case. In the case of controlling the lens control unit 203 so as to stop the movement of the optical lens 201, the control unit 109 changes the status of the zoom control signal to the "OFF" state. If the status of the zoom control signal is changed to the "ON" state, the lens control unit 203 starts to move the optical lens 201. If the status of the zoom control signal is changed to the "OFF" state, the lens control unit 203 stops the movement of the optical lens 201. Furthermore, in FIGS. 5 and 6, "t2" denotes the time when the control unit 109 causes the amplitude spectrum subtracting unit 254*a* to start the subtraction process using the noise profile. Furthermore, in FIGS. 5 and 6, "t3" denotes the time when the control unit 109 turns off the zoom control signal. The subtraction process using the noise profile is performed by the amplitude spectrum subtracting unit 254*a* in a period from the time t2 to the time t3.

In FIGS. 5 and 6, "It" denotes the amplitude spectrum at a given frequency fi resulting from the fast Fourier transform by the FFT 207*a*. Furthermore, in FIGS. 5 and 6, "Dt" denotes the amplitude spectrum that indicates the amplitude of the given frequency fi that has been integrated by the integrating circuit 250*a*. In FIGS. 5 and 6, "Pt" denotes the noise profile corresponding to the given frequency fi that has been generated by the profile generator 252*a*, and "Ut" denotes the amplitude spectrum at the given frequency fi that is output from the amplitude spectrum subtracting unit 254*a*. Furthermore, in FIGS. 5 and 6, "Nt" denotes a time-series digital audio signal at the given frequency fi after the noise signal is applied by the noise applying unit 215*a*.

The noise profile Pt has an amplitude spectrum of 512 points up to 24 kHz, which is the Nyquist frequency. The amplitude spectra Dt1 of 512 points in FIGS. 5 and 6 are the amplitude spectra indicating the environmental sound before the imaging apparatus 100 performs the zoom operation (in a state where the optical lens 201 is not moving), and correspond to 401 in FIG. 4. The amplitude spectra (Dt2) of 512 points in FIGS. 5 and 6 are the amplitude spectra indicating the environmental sound in the case where the imaging apparatus 100 is performing the zoom operation (in a state where the optical lens 201 is moving), and correspond to 402 in FIG. 4.

Figure 7:
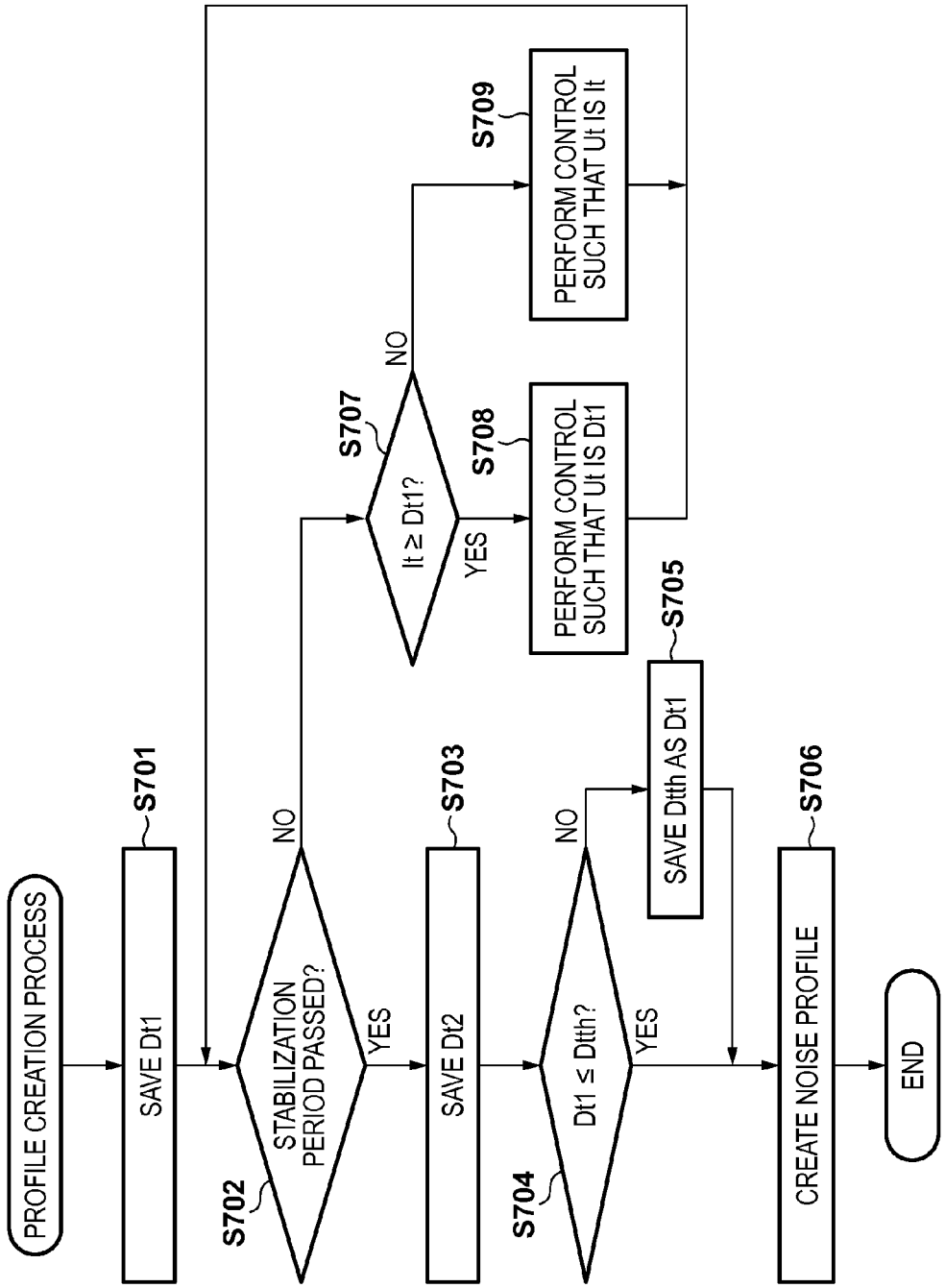
FIG. 7 is a flowchart showing an exemplary noise profile creation process in an embodiment.

FIG. 7 is a flowchart showing the noise profile creation process performed by the control unit 109. Next, the noise profile creation process performed by the control unit 109 will be described using FIG. 7. Note that the noise profile creation process will be described below, taking, as an example, the case where the profile generator 252*a* generates the noise profile. If an instruction to start the zoom operation has been input from the operation unit 110 (Yes in S305), the status of the zoom control signal is changed from the "OFF" state to the "ON" state by the control unit 109 (time t1). At the time t1, the control unit 109 controls the integrating circuit 250*a* so as to calculate Aave(fi) as described above. If Aave(fi) is calculated by the integrating circuit 250*a*, the control unit 109 saves Aave(fi) as the amplitude spectrum Dt1 in the memory 251*a* (S701).

Next, the control unit 109 controls the integrating circuit 250*a* so as to acquire the integration value at each frequency in the amplitude spectrum in the case where the lens control unit 203 is moving the optical lens 201, from the time t1 until the stabilization period passes. Thereafter, the control unit 109 determines whether or not the stabilization period has passed (S702). If the stabilization period has passed (time t2) (Yes in S702), the control unit 109 controls the integrating circuit 250*a* so as to calculate S(fi)/m as described above. If S(fi)/m is calculated by the integrating circuit 250*a*, the control unit 109 saves S(fi)/m as the amplitude spectrum Dt2 in the memory 251*a* (S703).

Next, the control unit 109 determines whether or not the amplitude spectrum Dt1 is smaller than or equal to Dtth, which is a predetermined amplitude spectrum (S704). It is assumed that the predetermined amplitude spectrum Dtth is stored in advance in the memory 103. The predetermined amplitude spectrum Dtth is set so as to be able to reduce the driving noise even in the case where the environmental sound before the zoom operation is started by the imaging apparatus 100 is large. The predetermined amplitude spectrum Dtth is set so as to be at a level lower than a noise level predicted as the noise of the imaging apparatus 100 by a predetermined level.

If it is determined that the amplitude spectrum Dt1 is larger than the predetermined amplitude spectrum Dtth (No in S704), the control unit 109 determines that the environmental sound before the zoom operation is started is large. If it is determined that the amplitude spectrum Dt1 is larger than the predetermined amplitude spectrum Dtth (No in S704), the timing chart of the noise profile creation process is as shown in FIG. 6. In this case (No in S704), the control unit 109 erases Aave(fi) saved as the amplitude spectrum Dt1 in the memory 251*a*, and causes the predetermined amplitude spectrum Dtth to be saved as the amplitude spectrum Dt1 in the memory 251*a* (S705). If the predetermined amplitude spectrum Dtth is saved as the amplitude spectrum Dt1 in the memory 251*a*, the control unit 109 performs the process in step S706. If it is determined that the amplitude spectrum Dt1 is smaller than or equal to the predetermined amplitude spectrum Dtth (Yes in S704), the timing chart of the noise profile creation process is as shown in FIG. 5. In this case (Yes in S704), the control unit 109 performs the process in S706.

Next, the control unit 109 controls the profile generator 252*a* so as to generate the noise profile Pt by subtracting the amplitude spectrum Dt1 from the amplitude spectrum Dt2 (S706). If the amplitude spectrum Dt1 is smaller than or equal to the predetermined amplitude spectrum Dtth, the profile generator 252*a* generates the noise profile Pt by subtracting Aave(fi) from the amplitude spectrum Dt2. If the amplitude spectrum Dt1 is larger than the predetermined amplitude spectrum Dtth, the profile generator 252*a* generates the noise profile Pt by subtracting the predetermined amplitude spectrum Dtth from the amplitude spectrum Dt2. The noise profile Pt generated by the profile generator 252*a* is stored in the profile storing unit 253*a*.

If the stabilization period has not passed (No in S702), the noise profile Pt has not been stored in the profile storing unit 253*a*, and therefore the driving noise cannot be reduced using the noise profile Pt. Then, the control unit 109 controls the amplitude spectrum subtracting unit 254*a* such that the amplitude spectrum Ut and the amplitude spectrum Dt1 are identical to each other. If the stabilization period has not passed, there are cases where the environmental sound suddenly changes in the middle as denoted by 501 in FIG. 5. In such cases, the control unit 109 determines whether or not the amplitude spectrum "It" is larger than or equal to the amplitude spectrum Dt1 (S707).

If it is determined that the amplitude spectrum "It" is larger than or equal to the amplitude spectrum Dt1 (Yes in S707), the control unit 109 controls the amplitude spectrum subtracting unit 254*a* such that the amplitude spectrum Ut and the amplitude spectrum Dt1 are identical to each other (S708). If it is determined that the amplitude spectrum "It" is larger than or equal to the amplitude spectrum Dt1 (Yes in S707), the amplitude spectrum Ut is controlled so as to be identical to the amplitude spectrum Dt1 until the stabilization period passes (from the time t1 to the time t2). If it is determined that the amplitude spectrum "It" is not larger than or equal to the amplitude spectrum Dt1 (No in S707), the control unit 109 controls the amplitude spectrum subtracting unit 254*a* such that the amplitude spectrum Ut is identical to the amplitude spectrum "It" (S709). If it is determined that the amplitude spectrum "It" is smaller than the amplitude spectrum Dt1 (No in S707), the amplitude spectrum Ut is controlled so as to be identical to the amplitude spectrum "It" until the stabilization period passes (from the time t1 to the time t2).

Note that the noise profile creation process in FIG. 7 has been described, taking, as an example, the case where the profile generator 252*a* generates the noise profile. However, in the case where the profile generator 252*b* of the noise reduction unit 200*b* in the L channel audio input unit 102*b* generates the noise profile as well, the control unit 109 generates the noise profile as in the noise profile creation process in FIG. 7.

Note that, in the case of FIG. 6, a state where the amplitude spectrum "It" is larger than or equal to the amplitude spectrum Dt1 and a state where the amplitude spectrum "It" is smaller than the amplitude spectrum Dt1 are alternately repeated in some cases. Even in such cases, the amplitude spectrum Ut is controlled so as not to exceed the amplitude spectrum Dt1. The imaging apparatus 100 can thereby reduce the driving noise in the period until the stabilization period passes (from the time t1 until the time t2).

Thus, in the period from when the zoom control signal is turned on until the stabilization period passes (from the time t1 until the time t2), the control unit 109 performs control such that the amplitude spectrum Ut is the amplitude spectrum "It" or the amplitude spectrum Dt1. The imaging apparatus 100 can thereby reduce the driving noise in the period from when the zoom control signal is turned on until the stabilization period passes (from the time t1 until the time t2). Furthermore, in a period after the stabilization period has passed (from the time t2 until the time t3), the control unit 109 can reduce the driving noise in the period after the stabilization period has passed (from the time t2 until the time t3) using the noise profile Pt. The imaging apparatus 100 can thereby seamlessly reduce the driving noise.

Noise Profile Correction Process (S309)

The noise profile correction process executed by the control unit 109 in step S309 will now be described using FIGS. 8, 9, 10, and 11A to 11C. The noise profile correction process will be described below, taking, as an example, the case where the profile correction unit 256*a* corrects the noise profile generated by the profile generator 252*a*.

Figure 8:
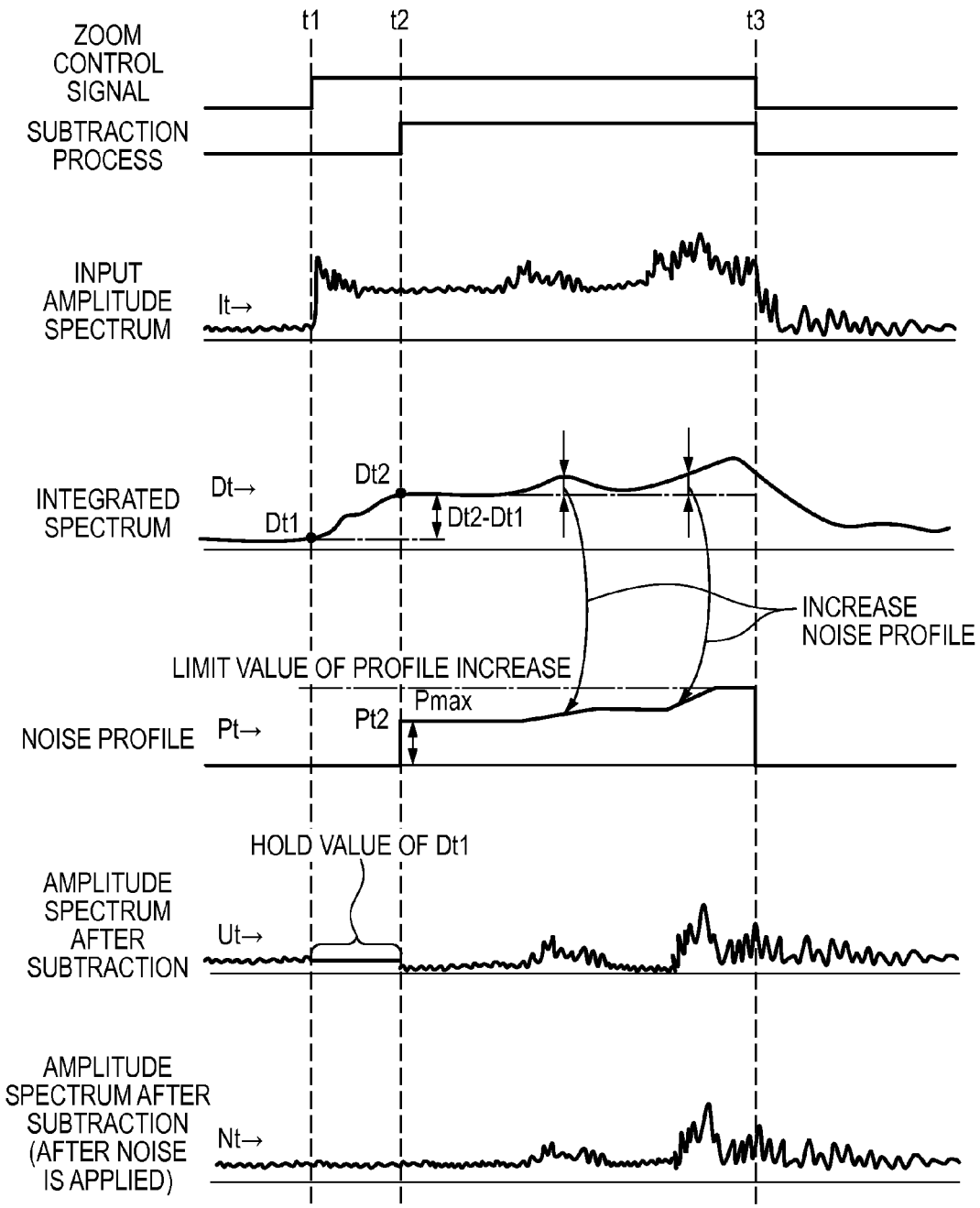
FIG. 8 is an exemplary timing chart showing an increasing correction process for a noise profile in an embodiment.
Figure 9:
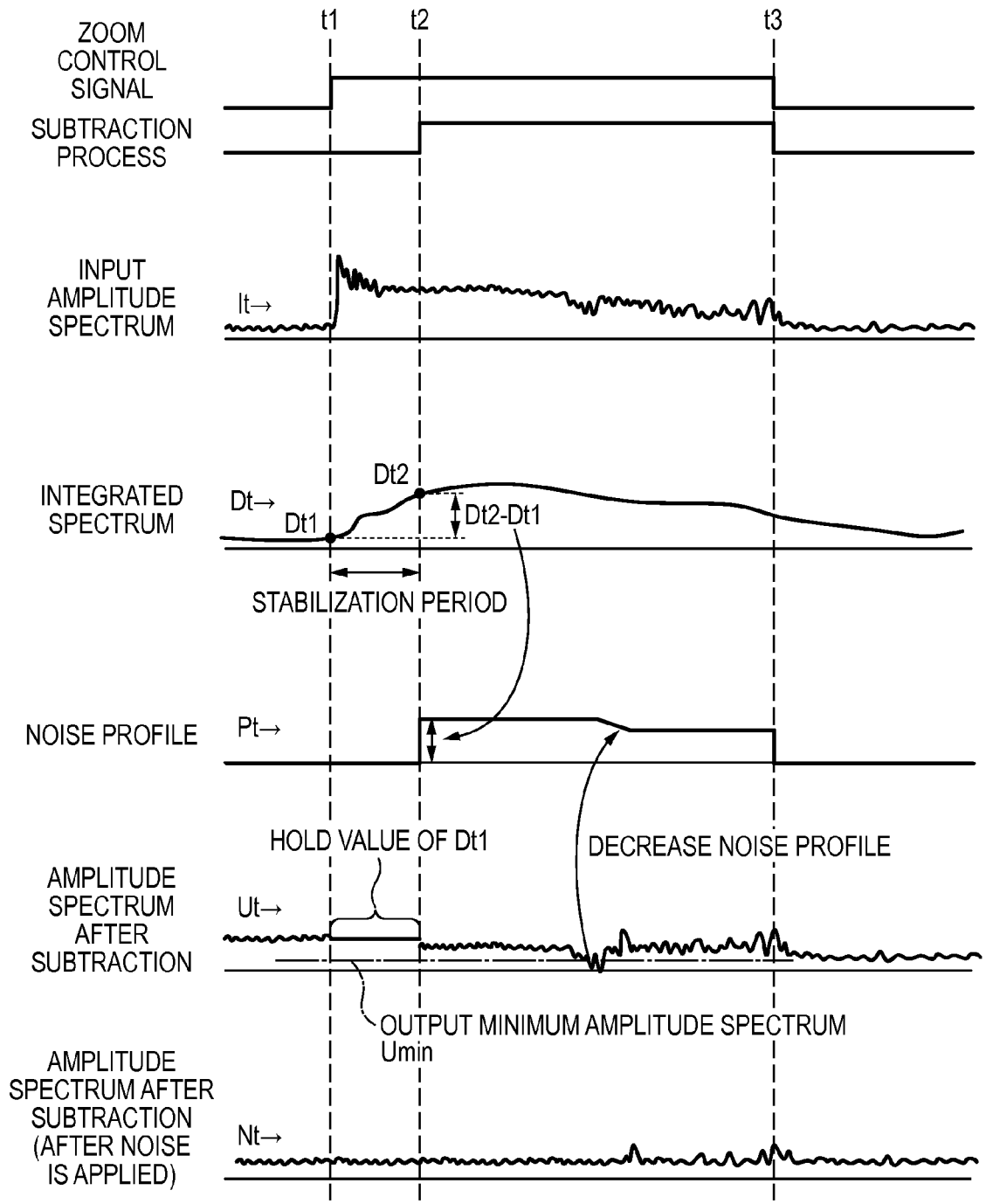
FIG. 9 is an exemplary timing chart showing a decreasing correction process for a noise profile in an embodiment.
Figure 11A:
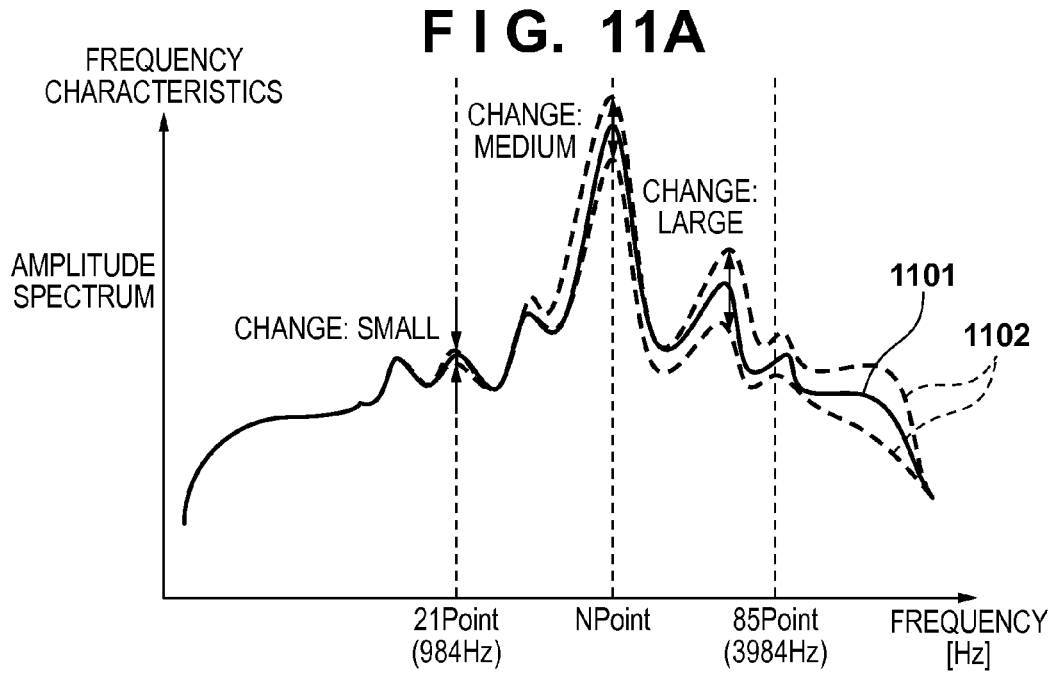
FIGS. 11A to 11C are diagrams showing exemplary settings of time constants related to the noise profile correction process in an embodiment.
Figure 11B:
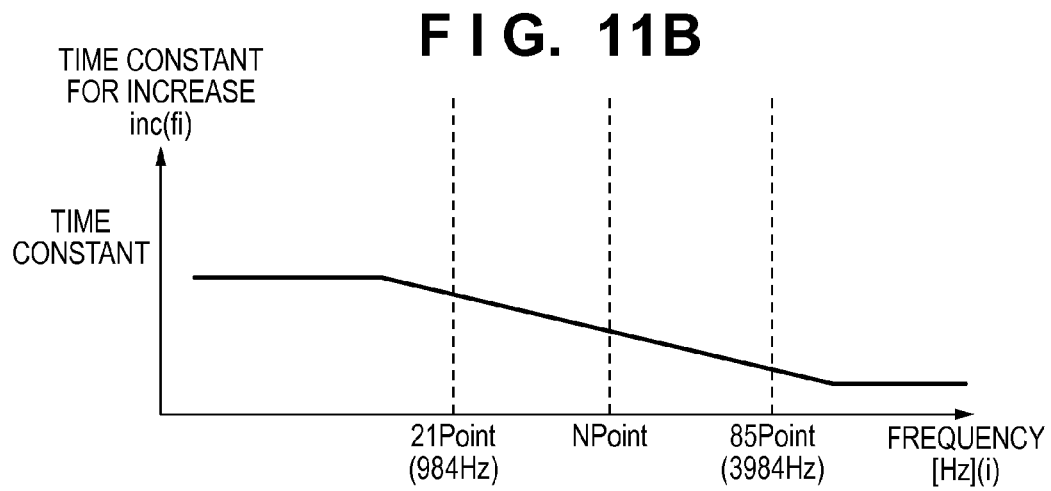
Figure 11C:
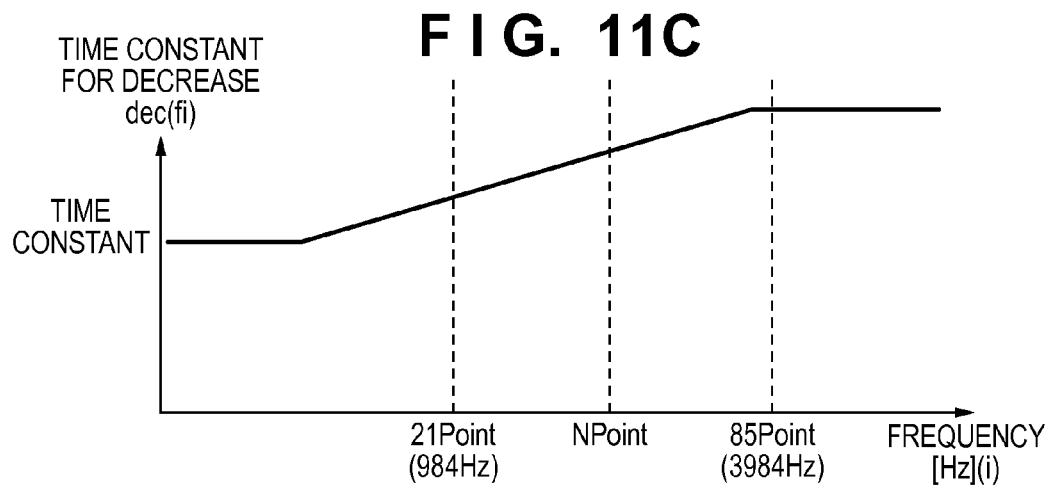

FIG. 8 is a timing chart showing a process for performing increasing correction on the noise profile Pt. FIG. 9 is a timing chart showing a process for performing decreasing correction on the noise profile Pt. t1, t2, t3, "It", Dt, Pt, Ut, and Nt in FIGS. 8 and 9 are the same as t1, t2, t3, "It", Dt, Pt, Ut, and Nt in FIGS. 5 and 6, and accordingly a description thereof will be omitted. FIGS. 11A to 11C are diagrams showing settings of time constants related to the noise profile correction process.

Figure 10:
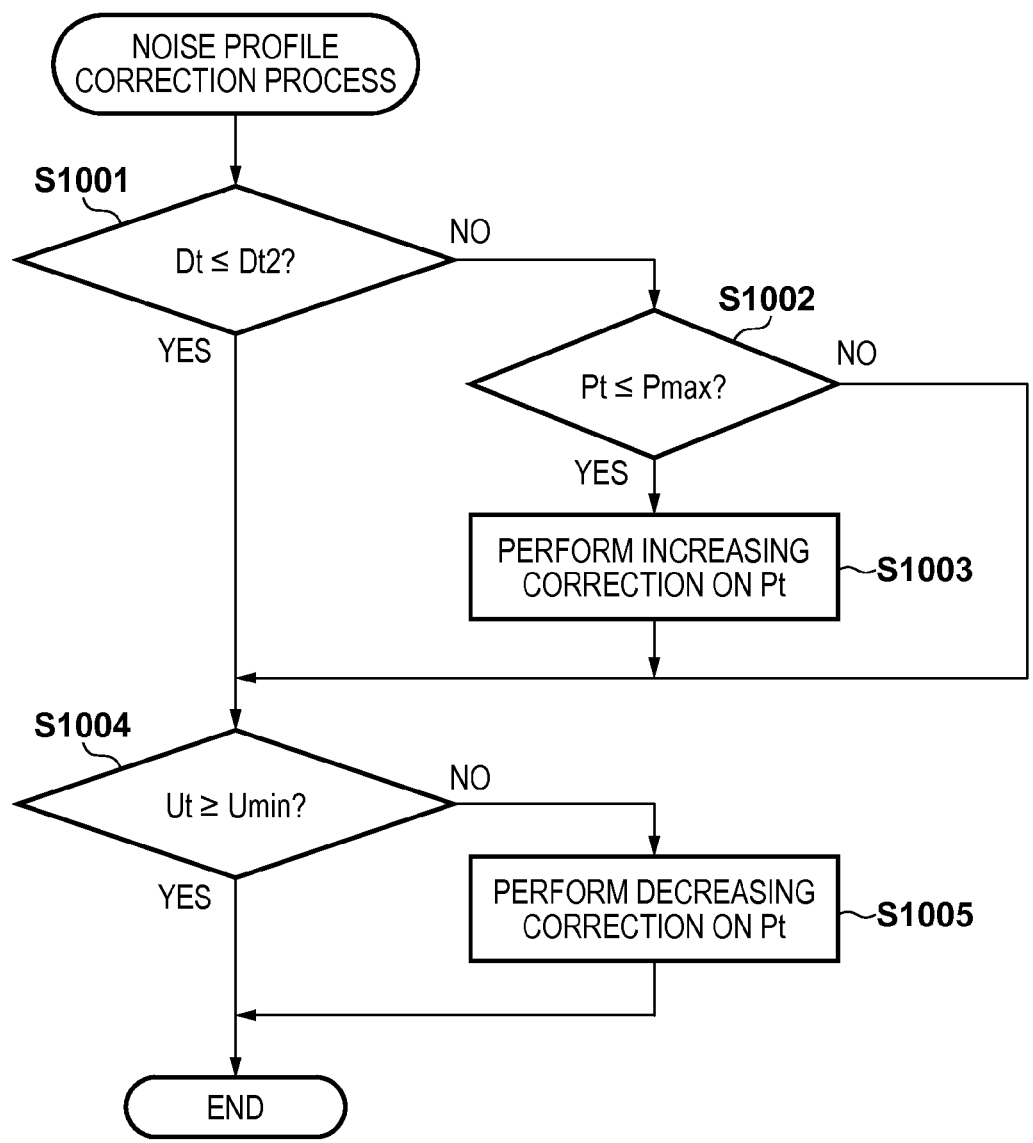
FIG. 10 is a flowchart showing an exemplary noise profile correction process in an embodiment.

FIG. 10 is a flowchart showing the noise profile correction process performed by the control unit 109. Next, the noise profile correction process performed by the control unit 109 will be described using FIG. 10. Note that the noise profile correction process will be described below, taking, as an example, the case where the profile correction unit 256a corrects the noise profile generated by the profile generator 252a. After the noise profile creation process in step S307 is performed, the integrating circuit 250a integrates the amplitude value at each frequency for a preset number of frames, and divides the integrated amplitude value by the preset number of frames, thereby calculating an average amplitude value at each frequency. The preset number of frames may be set by the user. If the preset number of frames is "1", the value of the amplitude spectrum output by the integrating circuit 250a is equal to the value output from the FFT 207a. The integrating circuit 250a outputs the average amplitude value at each frequency as the amplitude spectrum Dt.

The control unit 109 determines whether or not the amplitude spectrum Dt output from the integrating circuit 250a is smaller than or equal to the amplitude spectrum Dt2 (S1001). If it is determined that the amplitude spectrum Dt is larger than the amplitude spectrum Dt2 (No in S1001), the control unit 109 determines whether or not the noise profile Pt stored in the profile storing unit 253a is smaller than or equal to a first value Pmax (S1002). Note that the first value Pmax is a threshold value for restricting the increasing correction of the noise profile Pt. Furthermore, the first value Pmax is used to prevent a sense of incongruity caused by excessively reducing the driving noise.

As shown in FIG. 8, in the period from the time t2 until the time t3, the amplitude spectrum Dt becomes larger than the amplitude spectrum Dt2 with an increase of the driving noise. For this reason, the driving noise corresponding to the difference between the amplitude spectrum Dt and the amplitude spectrum Dt2 could not be reduced only by causing the amplitude spectrum subtracting unit 254a to perform the subtraction process using the noise profile Pt generated by the profile generator 252a. For this reason, if it is determined that the noise profile Pt is smaller than or equal to the first value Pmax (Yes in S1002), the control unit 109 causes the profile increasing unit 271a to perform the increasing correction of the noise profile Pt in accordance with a time constant inc(fi) (S1003). After the increasing correction of the noise profile Pt is performed, the control unit 109 performs the process in step S1004.

If it is determined that the noise profile Pt is not smaller than or equal to the first value Pmax (No in S1002), the control unit 109 does not cause the profile increasing unit 271a to perform the increasing correction of the noise profile Pt, in order to prevent an excessive reduction of the driving noise. If it is determined that the noise profile Pt is not smaller than or equal to the first value Pmax (No in S1002), the control unit 109 performs the process in step S1004. If it is determined that the amplitude spectrum Dt is smaller than or equal to the amplitude spectrum Dt2 (Yes in S1001), the control unit 109 performs the process in step S1004.

The control unit 109 determines whether or not the amplitude spectrum Ut output from the amplitude spectrum subtracting unit 254a is larger than or equal to a second value Umin (S1004). Note that the second value Umin is a threshold value for restricting the decreasing correction of the noise profile Pt. The second value Umin is the noise floor level, and is a value of smallest noise that is recorded even when sound is not input to the audio input unit 102. If it is determined that the amplitude spectrum Ut output from the amplitude spectrum subtracting unit 254a is larger than or equal to the second value Umin (Yes in S1004), the control unit 109 does not cause the profile decreasing unit 272a to perform the decreasing correction of the noise profile Pt, and ends the noise profile correction process.

As shown in FIG. 9, in the period from the time t2 until the time t3, the amplitude spectrum Ut becomes smaller than the second value Umin with a decrease of the driving noise. For this reason, there has been cases where the sound corresponding to the difference between the amplitude spectrum Ut and the second value Umin is erased if the amplitude spectrum subtracting unit 254a is caused only to perform the subtraction process using the noise profile Pt generated by the profile generator 252a. Therefore, if it is determined that the amplitude spectrum Ut output from the amplitude spectrum subtracting unit 254a is not larger than or equal to the second value Umin (No in S1004), the control unit 109 causes the profile decreasing unit 272a to perform the decreasing correction of the noise profile Pt in accordance with a time constant dec(fi) (S1005). After the decreasing correction of the noise profile Pt is performed, the control unit 109 ends the noise profile correction process.

Note that the noise profile correction process in FIG. 10 has been described, taking, as an example, the case where the profile correction unit 256a corrects the noise profile generated by the profile generator 252a. However, in the case where the profile correction unit 256b corrects the noise profile generated by the profile generator 252b as well, the control unit 109 corrects the noise profile as in the noise profile correction process in FIG. 10.

Next, a description will be given, using FIGS. 11A to 11C, of a method for setting the time constant inc(fi) of the increasing correction of the noise profile Pt performed by the profile increasing unit 271a and the time constant dec(fi) of the decreasing correction of the noise profile Pt performed by the profile decreasing unit 272a.

FIG. 11A is a diagram showing a characteristic of the driving noise at each frequency. FIG. 11B is a diagram showing a setting of the time constant inc(fi) in accordance with the frequency in the case of performing the increasing correction on the noise profile Pt. FIG. 11C is a diagram showing a setting of the time constant dec(fi) in accordance with the frequency in the case of performing the decreasing correction on the noise profile Pt.

In FIG. 11A, 1101 denotes the amplitude spectrum in the case where the zoom operation is being performed by the imaging apparatus 100, as the amplitude spectrum of 512 points. 1102 denotes a change of the amplitude spectrum of the driving noise in the case where the zoom operation is being performed by the imaging apparatus 100. As denoted by 1102, as the frequency band is higher, the change of the driving noise in the case where the zoom operation is being performed by the imaging apparatus 100 is larger.

Thereby, in the case where the increasing correction of the noise profile Pt is performed by the profile increasing unit 271a, the time constant inc(fi) is set to be smaller as the frequency band is higher as shown in FIG. 11B. This is for preventing a situation where the driving noise is not reduced and is left, by causing the increasing correction of the noise profile Pt to quickly follow the change of the driving noise.

Furthermore, in the case where the decreasing correction of the noise profile Pt is performed by the profile decreasing unit 272a, the time constant dec(fi) is set to be larger as the frequency band is higher as shown in FIG. 11C. This is for preventing a situation where the driving noise is not reduced and is left, by causing the decreasing correction of the noise profile Pt to slowly follow the change of the driving noise.

In this embodiment, the time constant dec(fi) at the time of performing the decreasing correction on the noise profile Pt is set to be larger than the time constant inc(fi) at the time of performing the increasing correction on the noise profile Pt.

After the reversion of the time-series audio signal is performed by the IFFT 214a, the noise applying unit 215a applies a noise signal to the audio signal supplied from the IFFT 214a. The noise applying unit 215a applies the noise signal in order to prevent a sense of incongruity caused by an excessive reduction of the driving noise by the noise reduction unit 200a. It is assumed that the noise signal applied by the noise applying unit 215a is a signal of the noise floor level. The reduction of the driving noise is thereby emphasized in the subtraction process performed by the amplitude spectrum subtracting unit 254a.

Figure 12:
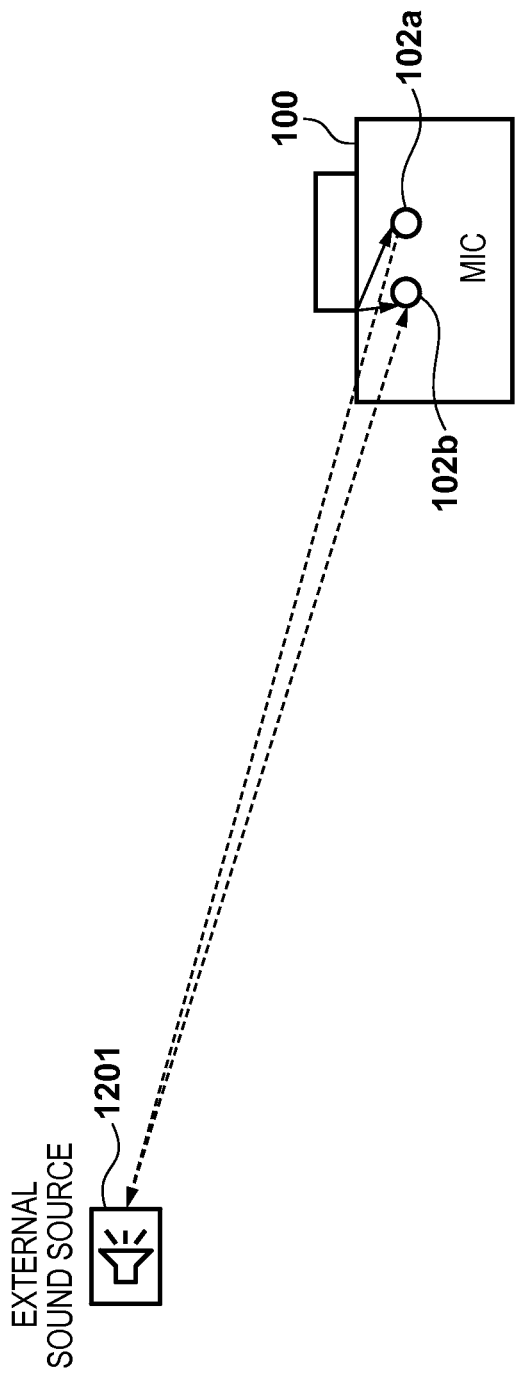
FIG. 12 is a diagram showing an exemplary relationship between an external sound source and an audio input unit in an embodiment.

FIG. 12 is a diagram showing an exemplary relationship between the external sound source 1201 and the audio input unit 102. In the case where the external sound source 1201 and the imaging apparatus 100 are separated from each other by a sufficient distance as shown in FIG. 12, the distance from the external sound source 1201 to the R channel audio input unit 102a is roughly the same as the distance from the external sound source 1201 to the L channel audio input unit 102b. Therefore, the difference between the environmental sound acquired by the microphone 205a and the environmental sound acquired by the microphone 205b is small.

However, the influence of the driving noise is different depending on the difference between the distance from the optical lens 201 to the R channel audio input unit 102a and the distance from the optical lens 201 to the L channel audio input unit 102b. For this reason, it is necessary to consider both the influence of the driving noise on the R channel audio input unit 102a and the influence of the driving noise on the L channel audio input unit 102b.

As indicated by the following equation, the difference between the influence of the driving noise on the R channel audio input unit 102a and the influence of the driving noise on the L channel audio input unit 102b becomes large. "DtL" in the following equation represents the amplitude value of the L (Left) channel before the noise reduction process is performed, and "DtR" represents the amplitude value of the R (Right) channel before the noise reduction process is performed. Furthermore, "βt" in the following equation is a left-right correlation amplitude spectrum.

$$\beta t = |DtL - DtR|/(DtL + DtR)$$

As the volume of the environmental sound is larger, the difference between the Lch and the Rch is larger. However, in the case of FIG. 12, since the distance from the external sound source 1201 to the R channel audio input unit 102a is roughly the same as the distance from the external sound source 1201 to the L channel audio input unit 102b, the left-right correlation amplitude spectrum βt is small. Regarding the driving noise, the left-right correlation amplitude spectrum βt is large due to the difference between the distance from the optical lens 201 to the R channel audio input unit 102a and the distance from the optical lens 201 to the L channel audio input unit 102b. It can be determined based on the left-right correlation amplitude spectrum βt whether or not the driving noise is dominant over the environmental sound.

Next, a description will be given, using FIGS. 13 and 14, of the noise profile correction process in which the influence of the driving noise on the Rch and the influence of the driving noise on the Lch are considered.

Figure 13:
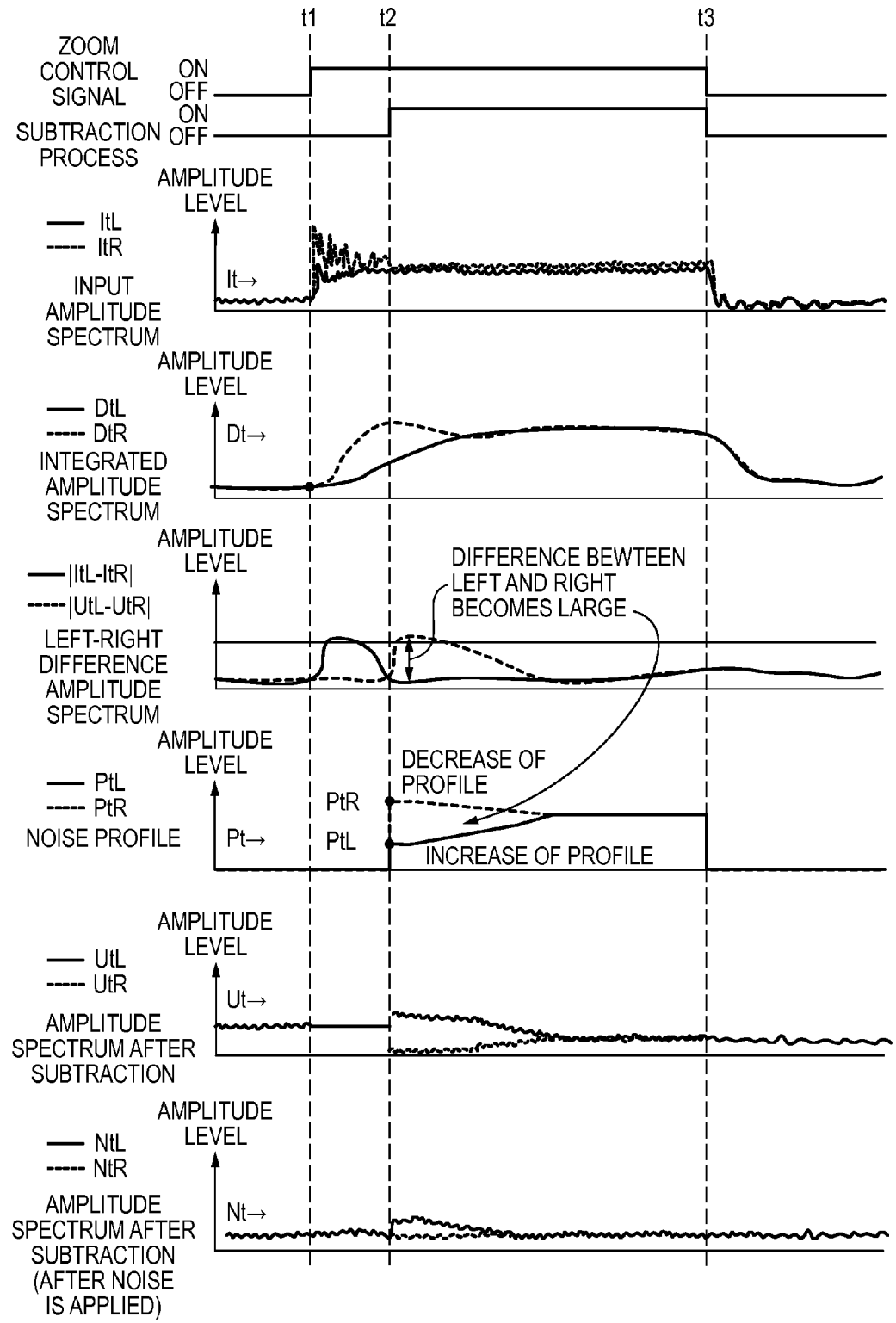
FIG. 13 is a timing chart showing an exemplary noise profile correction process for an Rch and an Lch in an embodiment.

FIG. 13 is a timing chart showing the process for correcting the noise profile for the Rch and the Lch. t1, t2, and t3 in FIG. 13 are the same as t1, t2, and t3 in FIGS. 5 and 6, and accordingly a description thereof will be omitted.

In FIG. 13, "ItR" denotes the amplitude spectrum at the given frequency fi resulting from the fast Fourier transform by the FFT 207a, and "ItL" denotes the amplitude spectrum at the given frequency fi resulting from the fast Fourier transform by the FFT 207b. The amplitude spectrum ItR is indicated by a dotted line, and the amplitude spectrum ItL is indicated by a solid line. Furthermore, in FIG. 13, "DtR" denotes the amplitude spectrum indicating the amplitude at the given frequency fi integrated by the integrating circuit 250a, and "DtL" denotes the amplitude spectrum indicating the amplitude at the given frequency fi integrated by the integrating circuit 250b. The amplitude spectrum DtR is indicated by a dotted line, and the amplitude spectrum DtL is indicated by a solid line. In FIG. 13, "PtR" denotes the noise profile that is generated by the profile generator 252a and corresponds to the given frequency fi, and "PtL" denotes the noise profile that is generated by the profile generator 252b and corresponds to the given frequency fi. The noise profile PtR is indicated by a dotted line, and the noise profile PtL is indicated by a solid line. At the time t2, the noise profile PtR is generated by the profile generator 252a, and the noise profile PtL is generated by the profile generator 252b.

In FIG. 13, "UtR" denotes the amplitude spectrum at the given frequency fi output from the amplitude spectrum subtracting unit 254a, and "UtL" denotes the amplitude spectrum at the given frequency fi output from the amplitude spectrum subtracting unit 254b. The amplitude spectrum UtR is indicated by a dotted line, and the amplitude spectrum UtL is indicated by a solid line. In FIG. 13, "NtR" denotes the time-series digital audio signal at the given frequency fi after the noise signal is applied by the noise applying unit 215a. In FIG. 13, "NtL" denotes the time-series digital audio signal at the given frequency fi after the noise signal is applied by the noise applying unit 215b. The amplitude spectrum NtR is indicated by a dotted line, and the amplitude spectrum NtL is indicated by a solid line. In FIG. 13, |ItL−ItR|, which is the absolute value of the difference between the amplitude spectrum ItL and the amplitude spectrum ItR, is indicated by a solid line. In FIG. 13, |UtL−UtR|, which is the absolute value of the difference between the amplitude spectrum UtL and the amplitude spectrum UtR is indicated by a dotted line.

As shown in FIG. 13, |UtL−UtR| surpasses |ItL−ItR| in some cases. This indicates that the driving noise is excessively reduced by the subtraction process in one of the amplitude spectrum UtL and the amplitude spectrum UtR. This occurs because one of the noise profile PtL and the noise profile PtR is too large.

Figure 14:
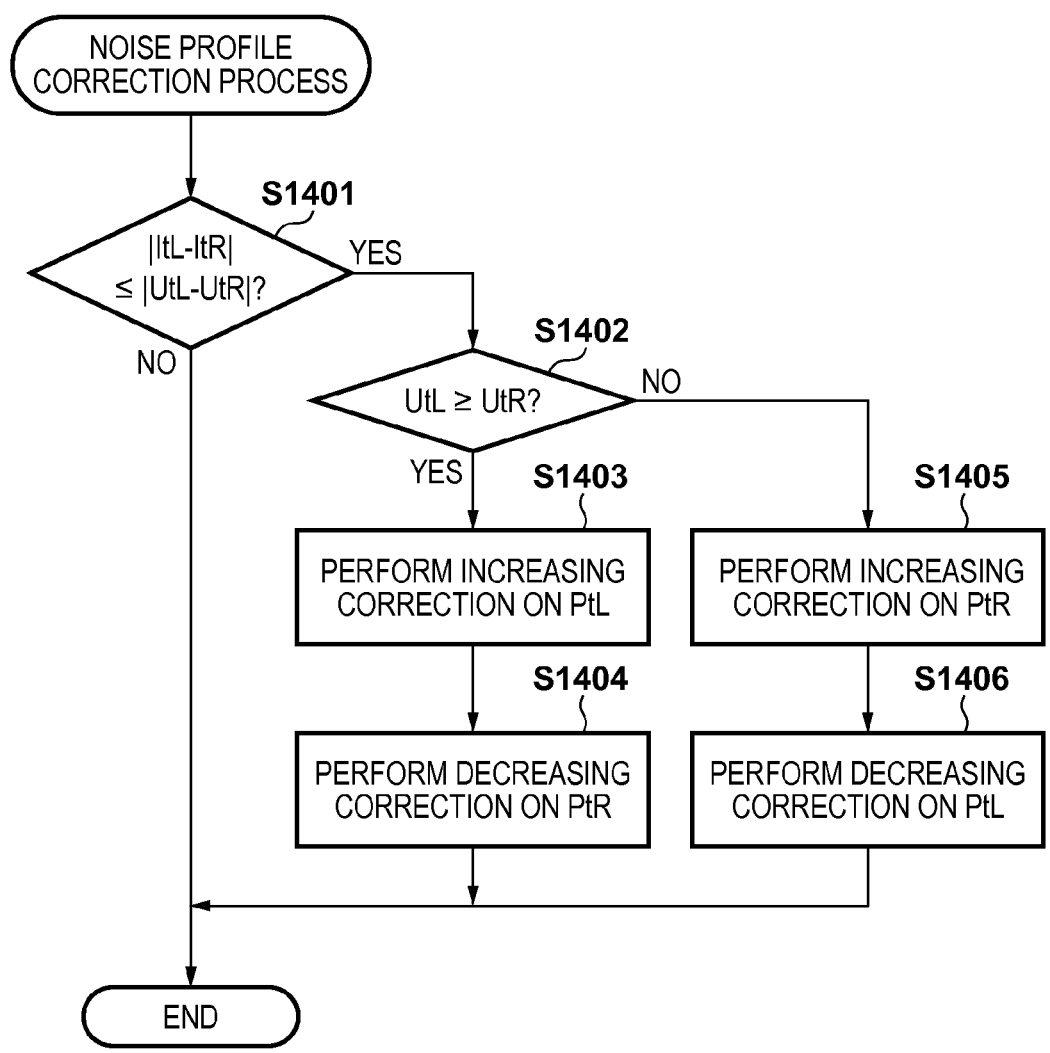
FIG. 14 is a flowchart showing an exemplary noise profile correction process for the Rch and the Lch in an embodiment.

FIG. 14 is a flowchart indicating an exemplary noise profile correction process for the Rch and the Lch. Next, the noise profile correction process for the Rch and the Lch performed by the control unit 109 will be described using FIG. 14. Note that the noise profile correction process for the Rch and the Lch in FIG. 14 is performed after the noise profile correction process in FIG. 10 is performed for the noise profile PtR and the noise profile correction process in FIG. 10 is performed for the noise profile PtL.

Thereafter, the control unit 109 detects the amplitude spectrum ItL, the amplitude spectrum ItR, the amplitude spectrum UtL, and the amplitude spectrum UtR, and determines whether or not the following condition holds (S1401).

Condition: $|ItL-ItR| \le |UtL-UtR|$

If it is determined that the condition $|ItL-ItR| \le |UtL-UtR|$ holds (Yes in S1401), the control unit 109 determines whether or not the amplitude spectrum UtL is larger than or equal to the amplitude spectrum UtR (S1402). If the amplitude spectrum UtL is larger than or equal to the amplitude spectrum UtR (Yes in S1402), the control unit 109 causes the profile increasing unit 271b to perform the increasing correction of the noise profile PtL in accordance with a time constant inc_L(fi) (S1403). The time constant inc_L(fi) is a time constant for the profile increasing unit 271b. Thereafter, the control unit 109 causes the profile decreasing unit 272a to perform the decreasing correction of the noise profile PtR in accordance with a time constant dec_R(fi) (S1404). The time constant dec_R(fi) is a time constant for the profile decreasing unit 272a. After the process in step S1404 is performed, the noise profile correction process for the Rch and the Lch ends. The time constant dec_R(fi) is larger than the time constant inc_L(fi).

If it is determined that the amplitude spectrum UtL is smaller than the amplitude spectrum UtR (No in S1402), the control unit 109 causes the profile increasing unit 271a to perform the increasing correction of the noise profile PtR in accordance with the time constant inc_R(fi) (S1405). The time constant inc_R(fi) is a time constant for the profile increasing unit 271a. Thereafter, the control unit 109 causes the profile decreasing unit 272b to perform the decreasing correction of the noise profile PtL in accordance with the time constant dec_L(fi) (S1406). The time constant dec_L(fi) is a time constant for the profile decreasing unit 272b. After the process in step S1406 is performed, the noise profile correction process for the Rch and the Lch ends. The time constant dec_L(fi) is larger than the time constant inc_R(fi).

If the condition $|ItL-ItR| \le |UtL-UtR|$ does not hold, $|ItL-ItR| > |UtL-UtR|$ holds. If it is determined that the condition $|ItL-ItR| \le UtL-UtR|$ does not hold (No in S1401), the noise profile correction process for the Rch and the Lch ends.

Thus, the control unit 109 is configured to correct the noise profile PtR and correct the noise profile PtL in accordance with a change of the environmental sound and the driving noise. In the imaging apparatus 100, the noise reduction process for the sound on the Rch and the noise reduction process for the sound on the Lch can thereby be appropriately performed. Accordingly, the imaging apparatus 100 can prevent a situation where a sense of incongruity occurs in the environmental sound as a result of driving noise that has not been erased remaining or the driving noise being excessively reduced.

Noise Reduction Process (S308)

The noise reduction process executed by the control unit 109 in step S308 will be described using FIGS. 15, 16A, 16B, and 17.

Figure 15:
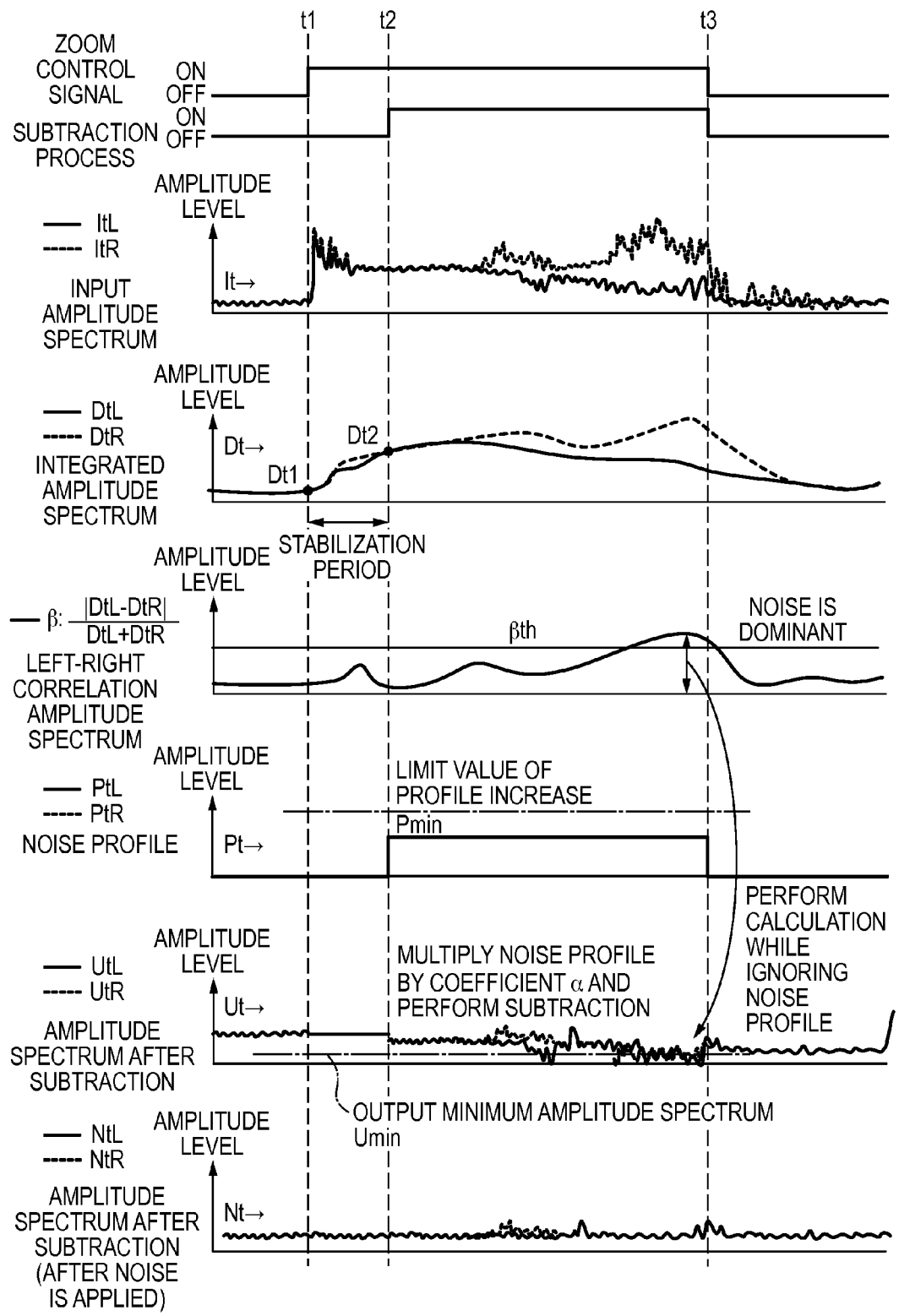
FIG. 15 is a timing chart showing an exemplary noise reduction process in an embodiment.

FIG. 15 is a timing chart showing the noise reduction process for the Rch and the Lch. t1, t2, and t3 in FIG. 15 are the same as t1, t2, and t3 in FIGS. 5 and 6, and accordingly a description thereof will be omitted. ItR, ItL, DtR, DtL, PtR, PtL, UtR, UtL, NtR, and NtL in FIG. 15 are the same as ItR, ItL, DtR, DtL, PtR, PtL, UtR, UtL, NtR, and NtL in FIG. 13, and accordingly a description thereof will be omitted.

In the case where the environmental sound or the driving noise suddenly changes while the zoom operation is being performed by the imaging apparatus 100, a sense of incongruity occurs in the remaining driving noise that has not been erased or in the environmental sound even if the driving noise is reduced using the noise profile PtR and the noise profile PtL in some cases. In order to prevent this, the control unit 109 performs the noise reduction process in accordance with the left-right correlation amplitude spectrum βt.

Figure 16A:
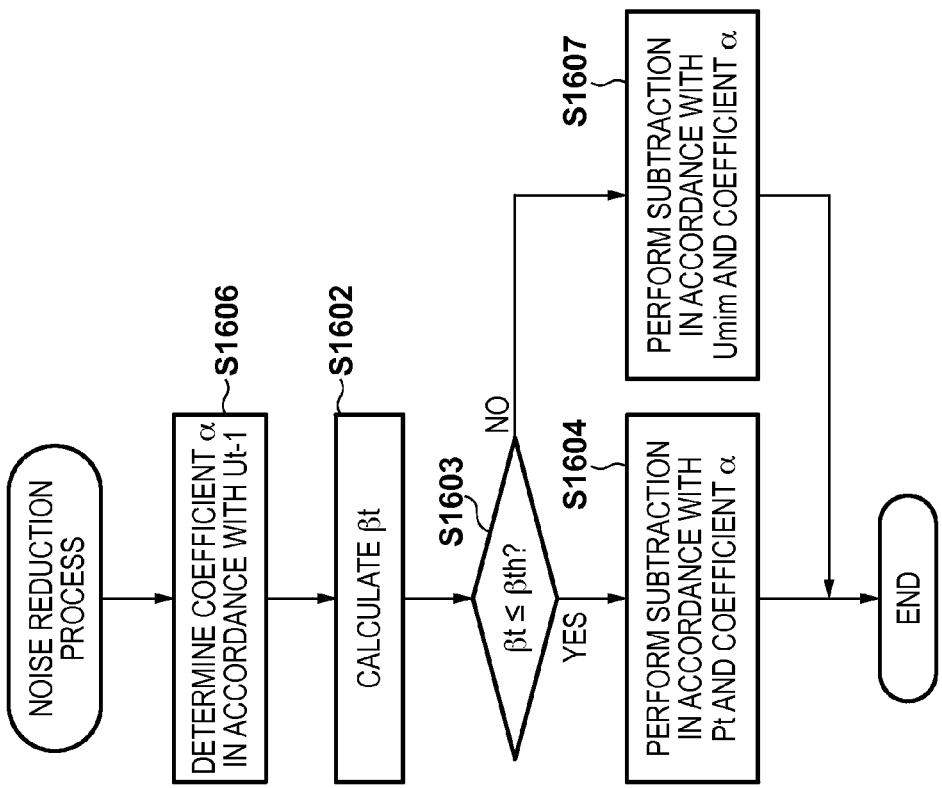
FIGS. 16A and 16B are flowcharts showing exemplary noise reduction processes in an embodiment.
Figure 16B:
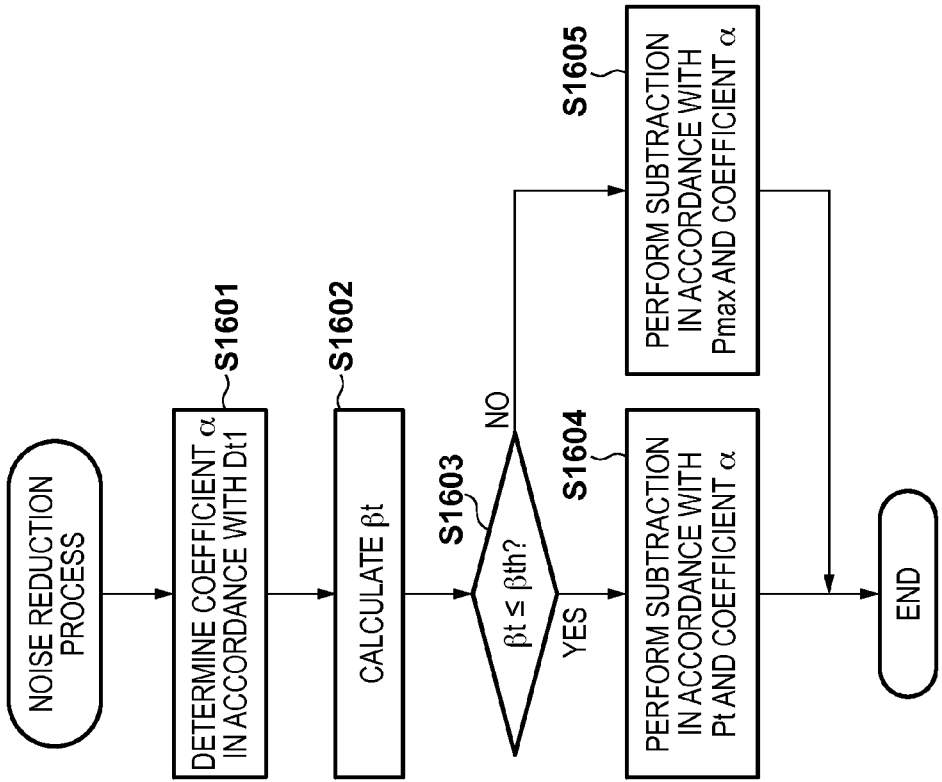
Figure 17:
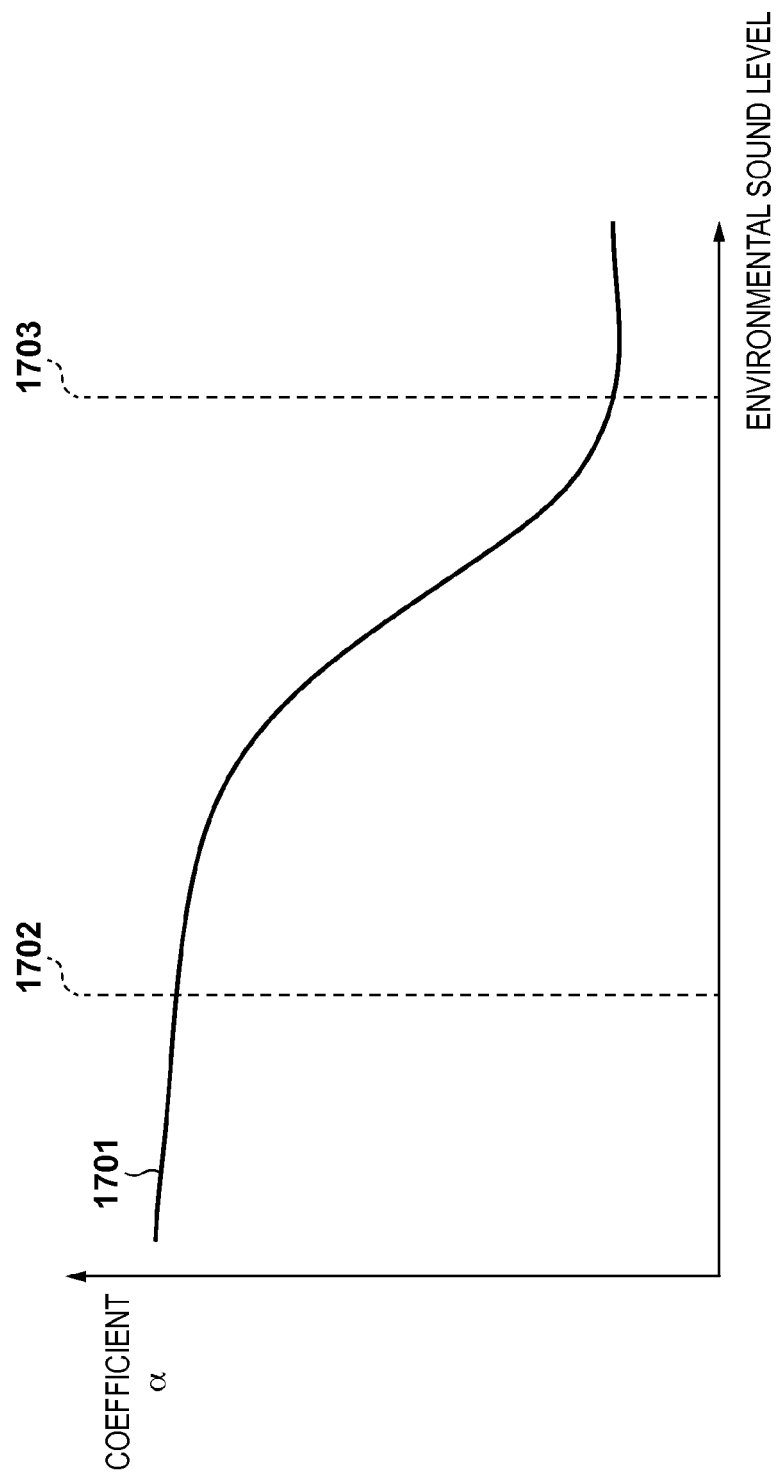
FIG. 17 is a diagram showing an exemplary relationship between a coefficient a and environmental sound in an embodiment.

FIGS. 16A and 16B are flowcharts showing exemplary noise reduction processes. FIG. 17 is a diagram showing a relationship between a coefficient α and the environmental sound. The horizontal axis in FIG. 17 indicates the level of the environmental sound, and the vertical axis in FIG. 17 indicates the value of the coefficient α. In FIG. 17, the coefficient α is associated with the level of the environmental sound. A solid line 1701 in FIG. 17 indicates the value of the coefficient α corresponding to the level of the environmental sound. A broken line 1702 indicates the level of the driving noise, and a broken line 1703 indicates the level which the driving noise is erased by the environmental sound when the level of the environment is equal to or larger than the level 1703. It is assumed that the coefficient α is smaller as the environmental sound level is larger. In the case where the environmental sound level is the level indicated by the broken line 1702, the coefficient α is 0.125.

Next, the noise reduction process performed by the control unit 109 will be described using FIGS. 16A and 17. Note that the noise reduction process in FIG. 16A will be described, taking, as an example, the case where the amplitude spectrum subtracting unit 254a performs the subtraction process.

At the time t1, the control unit 109 determines the coefficient α in accordance with the amplitude spectrum Dt1 saved in the memory 251a (S1601). The coefficient α is a coefficient by which the noise profile is multiplied. In step S1601, the control unit 109 detects the environmental sound level corresponding to the amplitude spectrum Dt1, and determines the value of the coefficient α corresponding to the detected environmental sound level in FIG. 17.

Next, the control unit 109 calculates the left-right correlation amplitude spectrum βt as described above (S1602). Thereafter, the control unit 109 determines whether or not the left-right correlation amplitude spectrum βt is smaller than or equal to a third value βth (S1603). Note that the third value βth is set in accordance with the value of the left-right correlation amplitude spectrum βt calculated when the environmental sound does not exist. As the environmental sound level is larger, the left-right correlation amplitude spectrum βt is closer to 0. In the case where the driving noise is dominant over the environmental sound, the left-right correlation amplitude spectrum βt is 0.2 or larger.

If it is determined that the left-right correlation amplitude spectrum βt is smaller than or equal to the third value βth (Yes in S1603), the control unit 109 performs the process in step S1604. In step S1604, the control unit 109 multiplies the noise profile PtR by the coefficient α determined in step S1601, and controls the amplitude spectrum subtracting unit 254a so as to subtract the resulting value from the amplitude spectrum ItR. If the subtraction process is performed by the amplitude spectrum subtracting unit 254a in step S1604, the amplitude spectrum UtR output from the amplitude spectrum subtracting unit 254a is as indicated by the following equation.

$$UtR = ItR - \alpha \cdot PtR$$

If it is determined that the left-right correlation amplitude spectrum βt is larger than the third value βth (No in S1603), the control unit 109 performs the process in step S1605. In step S1605, the control unit 109 multiplies the first value Pmax by the coefficient α determined in step S1601, and controls the amplitude spectrum subtracting unit 254a so as to subtract the resulting value from the amplitude spectrum ItR. If the subtraction process is performed by the amplitude spectrum subtracting unit 254a in step S1605, the amplitude spectrum UtR output from the amplitude spectrum subtracting unit 254a is as indicated by the following equation.

$$UtR = ItR - \alpha \cdot Pmax$$

If it is determined that the left-right correlation amplitude spectrum βt is not smaller than or equal to the third value βth (No in S1603), the control unit 109 does not use the noise profile PtR. Note that the noise reduction process in FIG. 16A has been described, taking, as an example, the case where the amplitude spectrum subtracting unit 254a performs the subtraction process. However, in the case where the amplitude spectrum subtracting unit 254b performs the subtraction process as well, the control unit 109 reduces the driving noise as in the noise reduction process in FIG. 16A.

Next, the noise reduction process performed by the control unit 109 will be described using FIGS. 16B and 17. Note that the noise reduction process in FIG. 16B will be described, taking, as an example, the case where the amplitude spectrum subtracting unit 254a performs the subtraction process.

Steps S1602, S1603, and S1604 in FIG. 16B are the same processes as steps S1602, S1603, and S1604 in FIG. 16A, and accordingly a description thereof will be omitted. The control unit 109 determines the coefficient α in accordance with the amplitude spectrum Ut-1 after the subtraction process for the previous frame (S1606). In step S1606, the control unit 109 detects the environmental sound level corresponding to the amplitude spectrum Ut-1, and determines the value of the coefficient a corresponding to the detected environmental sound level in FIG. 17. In the case where the amplitude spectrum subtracting unit 254a performs the subtraction process, in step S1606, the control unit 109 determines the coefficient α in accordance with the amplitude spectrum Ut-1R after the subtraction process for the previous frame performed by the amplitude spectrum subtracting unit 254a. Thereafter, the control unit 109 performs the processes in steps S1602 and S1603. If it is determined that the left-right correlation amplitude spectrum βt is smaller than or equal to the third value βth (Yes in S1603), the control unit 109 performs the process in step S1604. If it is determined that the left-right correlation amplitude spectrum βt is not smaller than or equal to the third value βth (No in S1603), the control unit 109 performs the process in step S1607.

In step S1607, the control unit 109 multiplies the second value Umin by the coefficient α determined in step S1606, and controls the amplitude spectrum subtracting unit 254a so as to subtract the resulting value from the amplitude spectrum ItR. If the subtraction process is performed by the amplitude spectrum subtracting unit 254a in step S1607, the amplitude spectrum UtR output from the amplitude spectrum subtracting unit 254a is as indicated by the following equation.

$$UtR = ItR - \alpha \cdot Umin$$

If it is determined that the left-right correlation amplitude spectrum βt is not smaller than or equal to the third value βth (No in S1603), the control unit 109 does not use the noise profile PtR. Note that the noise reduction process in FIG. 16B has been described, taking, as an example, the case where the amplitude spectrum subtracting unit 254a performs the subtraction process. However, in the case where the amplitude spectrum subtracting unit 254b performs the subtraction process as well, the control unit 109 reduces the driving noise as in the noise reduction process in FIG. 16B.

Although the noise reduction processes in FIGS. 16A and 16B have been described, one of the noise reduction processes in FIGS. 16A and 16B need only be performed by the control unit 109.

Thus, the control unit 109 changes the process for reducing the noise, in accordance with the left-right correlation amplitude spectrum βt. The imaging apparatus 100 can thereby appropriately reduce the driving noise in accordance with whether or not the driving noise is dominant over the environmental sound.

Post-Process (S310)

The post-process executed by the control unit 109 in step S310 will be described using FIGS. 18A to 18C and 19A to 19C.

FIGS. 18A to 18C are timing charts showing the post-processes. t1, t2, and t3 in FIGS. 18A to 18C are the same as t1, t2, and t3 in FIGS. 5 and 6, and accordingly a description thereof will be omitted. UtR and UtL in FIGS. 18A to 18C are the same as UtR and UtL in FIG. 13, and accordingly a description thereof will be omitted. An amplitude spectrum Qt in FIGS. 18A to 18C is an amplitude spectrum output after the post-process is performed.

Next, the post-process performed by the control unit 109 will be described using FIGS. 19A and 18A. In the case where the amplitude spectrum UtR is output from the amplitude spectrum subtracting unit 254a and the amplitude spectrum UtL is output from the amplitude spectrum subtracting unit 254b, the control unit 109 determines whether or not the amplitude spectrum UtL is smaller than or equal to the amplitude spectrum UtR (S1901).

If it is determined that the amplitude spectrum UtL is smaller than or equal to the amplitude spectrum UtR (Yes in S1901), the control unit 109 controls a post-correction unit 255b so as to output the amplitude spectrum UtL as the amplitude spectrum Qt to the IFFT 214b. Thereafter, the control unit 109 controls the post-correction unit 255a so as to output the amplitude spectrum UtL as the amplitude spectrum Qt to the IFFT 214a without outputting the amplitude spectrum UtR to the IFFT 214a (S1902). After the process in step S1902 is performed, the control unit 109 ends the post-process.

If it is determined that the amplitude spectrum UtL is larger than the amplitude spectrum UtR (No in S1901), the control unit 109 controls the post-correction unit 255a so as to output the amplitude spectrum UtR as the amplitude spectrum Qt to the IFFT 214a. Thereafter, the control unit 109 controls the post-correction unit 255b so as to output the amplitude spectrum UtR as the amplitude spectrum Qt to the IFFT 214b without outputting the amplitude spectrum UtL to the IFFT 214b (S1903). After the process in step S1903 is performed, the control unit 109 ends the post-process.

In the case where the post-process in FIG. 19A is performed, the smaller of the amplitude spectrum UtL and the amplitude spectrum UtR is input as the amplitude spectrum Qt to the IFFT 214a and the IFFT 214b, as in FIG. 18A.

Next, the post-process performed by the control unit 109 will be described using FIGS. 19B and 18B. In the case where the amplitude spectrum UtR is output from the amplitude spectrum subtracting unit 254a and the amplitude spectrum UtL is output from the amplitude spectrum subtracting unit 254b, the control unit 109 performs the process in step S1910. In step S1910, the control unit 109 determines whether or not one of the amplitude spectrum UtL and the amplitude spectrum UtR is smaller than or equal to a fourth value Qmin. Note that the fourth value Qmin is used to prevent a sense of incongruity caused by the post-process. The fourth value Qmin may be the same value as the second value Umin.

If one of the amplitude spectrum UtL and the amplitude spectrum UtR is smaller than or equal to the fourth value Qmin (Yes in S1910), the control unit 109 determines whether or not the amplitude spectrum UtL is smaller than or equal to the amplitude spectrum UtR (S1914). If it is determined that the amplitude spectrum UtL is smaller than or equal to the amplitude spectrum UtR (Yes in S1914), the control unit 109 controls the post-correction unit 255a so as to output the amplitude spectrum UtR as the amplitude spectrum Qt to the IFFT 214a. Thereafter, the control unit 109 controls the post-correction unit 255b so as to output the amplitude spectrum UtR as the amplitude spectrum Qt to the IFFT 214b without outputting the amplitude spectrum UtL to the IFFT 214b (S1915). After the process in step S1915 is performed, the control unit 109 ends the post-process. If it is determined that the amplitude spectrum UtL is larger than the amplitude spectrum UtR (No in S1914), the control unit 109 controls the post-correction unit 255b so as to output the amplitude spectrum UtL as the amplitude spectrum Qt to the IFFT 214b. Thereafter, the control unit 109 controls the post-correction unit 255a so as to output the amplitude spectrum UtL as the amplitude spectrum Qt to the IFFT 214a without outputting the amplitude spectrum UtR to the IFFT 214a (S1916). After the process in step S1916 is performed, the control unit 109 ends the post-process.

If both the amplitude spectrum UtL and the amplitude spectrum UtR are larger than the fourth value Qmin (No in S1910), the control unit 109 determines whether or not the amplitude spectrum UtL is smaller than or equal to the amplitude spectrum UtR (S1911).

If it is determined that the amplitude spectrum UtL is smaller than or equal to the amplitude spectrum UtR (Yes in S1911), the control unit 109 controls the post-correction unit 255a so as to output the amplitude spectrum UtL as the amplitude spectrum Qt to the IFFT 214b. Thereafter, the control unit 109 controls the post-correction unit 255a so as to output the amplitude spectrum UtL as the amplitude spectrum Qt to the IFFT 214a without outputting the amplitude spectrum UtR to the IFFT 214a. After the process in step S1912 is performed, the control unit 109 ends the post-process.

If it is determined that the amplitude spectrum UtL is larger than the amplitude spectrum UtR (No in S1911), the control unit 109 controls the post-correction unit 255a so as to output the amplitude spectrum UtR as the amplitude spectrum Qt to the IFFT 214a. Thereafter, the control unit 109 controls the post-correction unit 255b so as to output the amplitude spectrum UtR as the amplitude spectrum Qt to the IFFT 214b without outputting the amplitude spectrum UtL to the IFFT 214b (S1913). After the process in step S1913 is performed, the control unit 109 ends the post-process.

A description will now be given of the case where both the amplitude spectrum UtL and the amplitude spectrum UtR are larger than the fourth value Qmin when the post-process in FIG. 19B is performed. In this case, as in FIG. 18B, the smaller of the amplitude spectrum UtL and the amplitude spectrum UtR is input as the amplitude spectrum Qt to the IFFT 214a and the IFFT 214b.

Next, a description will be given of the case where one of the amplitude spectrum UtL and the amplitude spectrum UtR is smaller than or equal to the fourth value Qmin when the post-process in FIG. 19B is performed. In this case, as in FIG. 18B, the larger of the amplitude spectrum UtL and the amplitude spectrum UtR is input as the amplitude spectrum Qt to the IFFT 214a and the IFFT 214b.

Next, the post-process performed by the control unit 109 will be described using FIGS. 19C and 18C. In the case where the amplitude spectrum UtR is output from the amplitude spectrum subtracting unit 254a and the amplitude spectrum UtL is output from the amplitude spectrum subtracting unit 254b, the control unit 109 performs the process in step S1921. In step S1921, the control unit 109 calculates $\Delta tL$ and $\Delta tR$, and calculates $|\Delta tL - \Delta tR|$. $\Delta tL$ indicates the difference between the amplitude spectrum ItL and the amplitude spectrum UtL, and $\Delta tR$ indicates the difference between the amplitude spectrum ItR and the amplitude spectrum UtR. Furthermore, the control unit 109 determines whether or not the following condition holds.

$$|\Delta tL - \Delta tR| \le |\Delta tL - \Delta tR|max$$

Note that $|\Delta tL - \Delta tR|max$ is a predetermined threshold value, and is used to prevent a sense of incongruity in the left-right difference in the environmental sound caused by the difference between $\Delta tL$ and $\Delta tR$.

If it is determined that the condition $|\Delta tL - \Delta tR| \le |\Delta tL - \Delta tR|max$ holds (Yes in S1921), the control unit 109 determines whether or not the amplitude spectrum UtL is smaller than or equal to the amplitude spectrum UtR (S1922). If it is determined that the amplitude spectrum UtL is smaller than or equal to the amplitude spectrum UtR (Yes in S1922), the control unit 109 controls the post-correction unit 255b so as to output the amplitude spectrum UtL as the amplitude spectrum Qt to the IFFT 214b. Thereafter, the control unit 109 controls the post-correction unit 255a so as to output the amplitude spectrum UtL as the amplitude spectrum Qt to the IFFT 214a without outputting the amplitude spectrum UtR to the IFFT 214a (S1923).

After the process in step S1923 is performed, the control unit 109 ends the post-process. If it is determined that the amplitude spectrum UtL is larger than the amplitude spectrum UtR (No in S1922), the control unit 109 controls the post-correction unit 255a so as to output the amplitude spectrum UtR as the amplitude spectrum Qt to the IFFT 214a. Thereafter, the control unit 109 controls the post-correction unit 255b so as to output the amplitude spectrum UtR as the amplitude spectrum Qt to the IFFT 214b without outputting the amplitude spectrum UtL to the IFFT 214b (S1924). After the process in step S1924 is performed, the control unit 109 ends the post-process.

If the condition $|\Delta tL - \Delta tR| \le |\Delta tL - \Delta tR|max$ does not hold, $|\Delta tL - \Delta tR| > |\Delta tL - \Delta tR|max$ holds. If it is determined that the condition $|\Delta tL - \Delta tR| \le |\Delta tL - \Delta tR|max$ does not hold (No in S1921), the control unit 109 determines whether or not the amplitude spectrum UtL is smaller than or equal to the amplitude spectrum UtR (S1925).

If it is determined that the amplitude spectrum UtL is smaller than or equal to the amplitude spectrum UtR (Yes in S1925), the control unit 109 controls the post-correction unit 255a so as to output the amplitude spectrum UtR as the amplitude spectrum Qt to the IFFT 214a. Thereafter, the control unit 109 controls the post-correction unit 255b so as to output the amplitude spectrum UtR as the amplitude spectrum Qt to the IFFT 214b without outputting the amplitude UtL to the IFFT 214b (S1926). After the process in step S1926 is performed, the control unit 109 ends the post-process. If it is determined that the amplitude spectrum UtL is larger than the amplitude spectrum UtR (No in S1925), the control unit 109 controls the post-correction unit 255b so as to output the amplitude spectrum UtL as the amplitude spectrum Qt to the IFFT 214b. Thereafter, the control unit 109 controls the post-correction unit 255a so as to output the amplitude spectrum UtL as the amplitude spectrum Qt to the IFFT 214a without outputting the amplitude spectrum UtR to the IFFT 214a (S1927). After the process in step S1927 is performed, the control unit 109 ends the post-process.

Figure 19C:
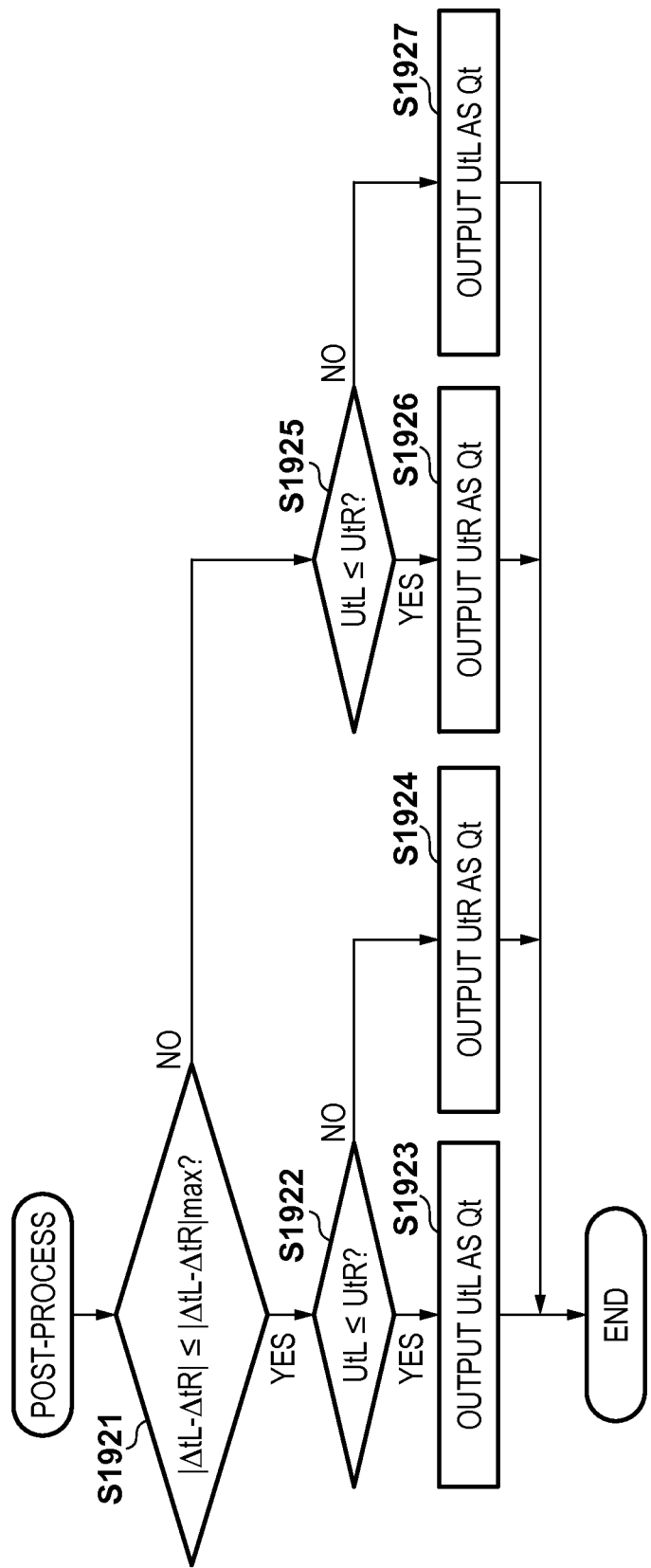

A description will be given of the case where |ΔtL−ΔtR|≤|ΔtL−ΔtR|max holds when the post-process in FIG. 19C is performed. In this case, as in FIG. 18C, the smaller of the amplitude spectrum UtL and the amplitude spectrum UtR is input as the amplitude spectrum Qt to the IFFT 214a and the IFFT 214b.

Next, a description will be given of the case where |ΔtL−ΔtR|≤|ΔtL−ΔtR|max does not hold when the post-process in FIG. 19C is performed. In this case, as in FIG. 18C, the larger of the amplitude spectrum UtL and the amplitude spectrum UtR is input as the amplitude spectrum Qt to the IFFT 214a and the IFFT 214b.

Although the post-processes in FIGS. 19A, 19B, and 19C have been described, one of the post-processes in FIGS. 19A, 19B, and 19C need only be performed by the control unit 109.

After one of the post-processes in FIGS. 19A, 19B, and 19C is performed, the IFFT 214a performs the inverse fast Fourier transform on the amplitude spectrum Qt using the phase information supplied from the FFT 207a, and thereby generates the original time-series audio data. After one of the post-processes in FIGS. 19A, 19B, and 19C is performed, the IFFT 214b performs the inverse fast Fourier transform on the amplitude spectrum Qt using the phase information supplied from the FFT 207b, and thereby generates the original time-series audio data.

Thus, the control unit 109 performs the processes for performing correction such that the levels of the sound on the Rch and the sound on the Lch coincide with each other. The imaging apparatus 100 can thereby prevent occurrence of a sense of incongruity caused by the left-right difference in the environmental sound.

Although the imaging apparatus 100 has a configuration in which sound on two channels, which are the Rch and the Lch, are input in the description of this embodiment, the imaging apparatus 100 may have a configuration in which sound on two or more channels is input. Furthermore, the imaging apparatus 100 may have a configuration in which sound of one channel is input.

Other Embodiments

The embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment and/or that includes one or more circuits (e.g., application specific integrated circuit (ASIC)) for performing the functions of one or more of the above-described embodiment, and by a method performed by the computer of the system or apparatus by, for example, reading out and executing the computer executable instructions from the storage medium to perform the functions of one or more of the above-described embodiment and/or controlling the one or more circuits to perform the functions of one or more of the above-described embodiment. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2014-180495, 2014-180496, 2014-180497, 2014-180498 and 2014-180499 filed Sep. 4, 2014, which are hereby incorporated by reference wherein in their entirety.

What is claimed is:

1. An electronic device comprising:
a first microphone unit;
a second microphone unit;
an input unit that inputs a drive instruction to drive a drive unit;
a first transforming unit that acquires a first audio spectrum by performing Fourier transform on audio data obtained by the first microphone unit;
a second transforming unit that acquires a second audio spectrum by performing Fourier transform on audio data obtained by the second microphone unit;
a first subtracting unit that subtracts a first noise spectrum from the first audio spectrum so as to reduce noise in audio data obtained by the first microphone unit if the drive instruction is input, wherein the first noise spectrum is generated after the drive instruction is input, using the audio data obtained by the first microphone unit;
a second subtracting unit that subtracts a second noise spectrum from the second audio spectrum so as to reduce noise in audio data obtained by the second microphone unit if the drive instruction is input, wherein the second noise spectrum is generated after the drive instruction is input, using the audio data obtained by the second microphone unit;
a control unit that selects one of a third audio spectrum and a fourth audio spectrum in accordance with a result of comparison between the third audio spectrum and the fourth audio spectrum, wherein the third audio spectrum is acquired by subtracting the first noise spectrum from the first audio spectrum, and the fourth audio spectrum is acquired by subtracting the second noise spectrum from the second audio spectrum;
a third transforming unit that acquires first audio data by performing inverse Fourier transform on the audio spectrum selected from among the third audio spectrum and the fourth audio spectrum;
a fourth transforming unit that acquires second audio data by performing inverse Fourier transform on the audio spectrum selected from among the third audio spectrum and the fourth audio spectrum; and
a storing unit that stores the first audio data and the second audio data.

2. The electronic device according to claim 1, wherein the control unit selects the fourth audio spectrum if the third audio spectrum is larger than the fourth audio spectrum, and the control unit selects the third audio spectrum if the fourth audio spectrum is larger than the third audio spectrum.

3. The electronic device according to claim 1, wherein the control unit selects the fourth audio spectrum if the fourth audio spectrum is larger than the third audio spectrum, and the control unit selects the third audio spectrum if the third audio spectrum is larger than the fourth audio spectrum.

4. The electronic device according to claim 1, wherein each of the first noise spectrum and the second noise spectrum relates noise is generated from the driving unit.

5. The electronic device according to claim 1, wherein the first audio data corresponds to sound of one of a left channel and a right channel, and the second audio data corresponds to sound of the other channel.

6. The electronic device according to claim 1, wherein the third transforming unit performs inverse Fourier transform on the selected one of the third audio spectrum and the fourth audio spectrum using phase information regarding the audio data obtained by the first microphone unit.

7. The electronic device according to claim 1, wherein the fourth transforming unit performs inverse Fourier transform on the selected one of the third audio spectrum and the fourth audio spectrum using phase information regarding the audio data obtained by the second microphone unit.

8. The electronic device according to claim 1, wherein the drive unit is used to perform a zoom operation.

9. The electronic device according to claim 1, wherein the drive unit is used to move a lens unit.

10. The electronic device according to claim 1, wherein the first noise spectrum is generated using audio data obtained by the first microphone unit before the drive instruction is input, and audio data obtained by the first microphone unit after the drive instruction is input.

11. The electronic device according to claim 1, wherein the second noise spectrum is generated using audio data obtained by the second microphone unit before the drive instruction is input, and audio data obtained by the second microphone unit after the drive instruction is input.

12. The electronic device according to claim 1, wherein the third audio spectrum is outputted to the third transforming unit and the fourth transforming unit if the control unit selects the third audio spectrum, and the fourth audio spectrum is outputted to the third transforming unit and the fourth transforming unit if the control unit selects the fourth audio spectrum.

13. A control method for controlling an electronic device, wherein the electronic device has a first microphone unit and a second microphone unit, the control method comprising:
  acquiring a first audio spectrum by performing Fourier transform on audio data obtained by the first microphone unit;
  acquiring a second audio spectrum by performing Fourier transform on audio data obtained by the second microphone unit;
  acquiring a third audio spectrum by subtracting a first noise spectrum from the first audio spectrum so as to reduce noise in audio data obtained by the first microphone unit if a drive instruction to drive a drive unit is input, wherein the first noise spectrum is generated after the drive instruction is input, using the audio data obtained by the first microphone unit;
  acquiring a fourth audio spectrum by subtracting a second noise spectrum from the second audio spectrum so as to reduce noise in audio data obtained by the second microphone unit if the drive instruction is input, wherein the second noise spectrum is generated after the drive instruction is input, using the audio data obtained by the second microphone unit;
  selecting one of the third audio spectrum and the fourth audio spectrum in accordance with a result of comparison between the third audio spectrum and the fourth audio spectrum;
  acquiring first audio data by performing inverse Fourier transform on the audio spectrum selected from among the third audio spectrum and the fourth audio spectrum;
  acquiring second audio data by performing inverse Fourier transform on the audio spectrum selected from among the third audio spectrum and the fourth audio spectrum; and
  storing the first audio data and the second audio data.

14. The control method according to claim 13, wherein the selecting selects the fourth audio spectrum if the third audio spectrum is larger than the fourth audio spectrum, and selects the third audio spectrum if the fourth audio spectrum is larger than the third audio spectrum.

15. The control method according to claim 13, wherein the selecting selects the third audio spectrum if the third audio spectrum is larger than the fourth audio spectrum, and selects the fourth audio spectrum if the fourth audio spectrum is larger than the third audio spectrum.

16. The control method according to claim 13, wherein the drive unit is used to perform a zoom operation.

17. The control method according to claim 13, wherein the drive unit is used to move a lens unit.

18. The control method according to claim 13, wherein the first noise spectrum is generated using audio data obtained by the first microphone unit before the drive instruction is input, and audio data obtained by the first microphone unit after the drive instruction is input.

19. The control method according to claim 13, wherein the second noise spectrum is generated using audio data obtained by the second microphone unit before the drive instruction is input, and audio data obtained by the second microphone unit after the drive instruction is input.

20. The control method according to claim 13, wherein the first audio data and the second audio data are acquired by performing inverse Fourier transform on the third audio spectrum if the selecting selects the third audio spectrum, and the first audio data and the second audio data are acquired by performing inverse Fourier transform on the fourth audio spectrum if the selecting selects the fourth audio spectrum.

* * * * *